US012713271B2

(12) United States Patent
Svedman et al.

(10) Patent No.: US 12,713,271 B2
(45) Date of Patent: Aug. 18, 2026

(54) METHODS AND APPARATUSES FOR EVENT-TRIGGERED ACTIVATION OF MEASUREMENT REPORTING IN WIRELESS COMMUNICATIONS

(71) Applicant: InterDigital Patent Holdings, Inc., Wilmington, DE (US)

(72) Inventors: Patrick Svedman, Stockholm (SE); Tariq Elkourdi, Belleville, NJ (US); Ravikumar Pragada, Warrington, PA (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 309 days.

(21) Appl. No.: 18/634,067

(22) Filed: Apr. 12, 2024

(65) Prior Publication Data

US 2025/0324304 A1 Oct. 16, 2025

(51) Int. Cl.
*H04W 24/10* (2009.01)
*H04W 24/08* (2009.01)

(52) U.S. Cl.
CPC ............ *H04W 24/10* (2013.01); *H04W 24/08* (2013.01)

(58) Field of Classification Search
None
See application file for complete search history.

(56) References Cited

U.S. PATENT DOCUMENTS 8,694,043 B2 4/2014 Racz et al.
12,471,004 B2 * 11/2025 Lei .......................... H04L 5/005
12,490,157 B2 * 12/2025 Lin .................. H04W 36/0058

FOREIGN PATENT DOCUMENTS

EP 4167640 A1 4/2023
WO 2023132783 A1 7/2023

* cited by examiner

*Primary Examiner* — Hong S Cho
(74) *Attorney, Agent, or Firm* — Flaster Greenberg, P.C.

(57) ABSTRACT

Methods and apparatuses for event-triggered signal measurement reporting in wireless communications are provided. An example method implemented by a wireless transmit/receive unit (WTRU) includes receiving configuration information indicating a PSS configuration, an SSS configuration, a PSS measurement timing configuration, an SSS measurement timing configuration, and one or more triggering conditions for measurement reporting; performing measurement for one or more PSSs based on the PSS measurement timing configuration; transmitting, based on a triggering condition of the one or more triggering conditions being met, a first measurement report for the one or more PSSs using the PSS configuration; determining, based on the triggering condition being met, that SSS measurement reporting is activated; performing measurement for one or more SSSs based on the SSS measurement timing configuration; and transmitting a second measurement report for the one or more SSSs using the SSS configuration and after transmitting the first measurement report.

20 Claims, 12 Drawing Sheets

METHODS AND APPARATUSES FOR EVENT-TRIGGERED ACTIVATION OF MEASUREMENT REPORTING IN WIRELESS COMMUNICATIONS

FIELD

This disclosure relates to communication networks, wireless and/or wired. Embodiments disclosed herein are related to procedures, methods, architectures, apparatuses, systems, devices, and computer program products for, and/or directed to event-triggered signal measurement reporting in wireless communications.

SUMMARY

One or more embodiments disclosed herein are related to methods and apparatuses for event-triggered activation of measurement reporting and measurement gap update in wireless communications. For example, methods and apparatuses for event-triggered activation of secondary synchronization signal (SSS)-based reporting and measurement gap update in non-standalone single-carrier frequency domain equalization (SC-FDE) systems are provided.

In one embodiment, a method implemented in a wireless transmit and/or receive unit (WTRU) (or a user equipment (UE) for wireless communications includes receiving configuration information indicating a primary synchronization signal (PSS) configuration and a secondary synchronization signal (SSS) configuration, and the PSS configuration indicates a triggering condition, and the SSS configuration indicates a time offset and a time period for SSS measurement. The method also includes transmitting, based on the triggering condition being met, a measurement report for one or more PSSs using the PSS configuration; and performing, after the time offset starting from the triggering condition being met, measurement for one or more SSSs in the time period.

In one embodiment, a WTRU (or UE) for wireless communications comprises circuitry, including a processor, a transmitter, a receiver, and/or memory is provided. The WTRU is configured to receive configuration information indicating a PSS configuration and an SSS configuration, and the PSS configuration indicates a triggering condition, and the SSS configuration indicates a time offset and a time period for SSS measurement. The WTRU is further configured to transmit, based on the triggering condition being met, a measurement report for one or more PSSs using the PSS configuration; and to perform, after the time offset starting from the triggering condition being met, measurement for one or more SSSs in the time period.

In one embodiment, a method implemented in a WTRU (or a UE) for wireless communications includes receiving configuration information indicating a PSS configuration, an SSS configuration, a PSS measurement timing configuration, an SSS measurement timing configuration, and one or more triggering conditions for measurement reporting; performing measurement for one or more PSSs based on the PSS measurement timing configuration; transmitting, based on a triggering condition of the one or more triggering conditions being met, a first measurement report for the one or more PSSs using the PSS configuration; determining, based on the triggering condition being met, that SSS measurement reporting is activated; performing measurement for one or more SSSs based on the SSS measurement timing configuration; and transmitting a second measurement report for the one or more SSSs using the SSS configuration and after transmitting the first measurement report.

In one embodiment, a WTRU (or UE) for wireless communications comprises circuitry, including a processor, a transmitter, a receiver, and/or memory is provided. The WTRU is configured to receive configuration information indicating a PSS configuration, an SSS configuration, a PSS measurement timing configuration, an SSS measurement timing configuration, and one or more triggering conditions for measurement reporting; to perform measurement for one or more PSSs based on the PSS measurement timing configuration; to transmit, based on a triggering condition of the one or more triggering conditions being met, a first measurement report for the one or more PSSs using the PSS configuration; to determine, based on the triggering condition being met, that SSS measurement reporting is activated; to perform measurement for one or more SSSs based on the SSS measurement timing configuration; and to transmit a second measurement report for the one or more SSSs using the SSS configuration and after transmitting the first measurement report.

BACKGROUND

In 5G NR, when a device starts initial access or decides to transition from idle/inactive state to active state, the device searches for SS/PBCH blocks (SSBs) which are periodically transmitted by the network. An SS/PBCH Block comprises a Primary Synchronization Signal (PSS), Secondary Synchronization Signal(s) (SSS), and a Physical Broadcast Channel (PBCH). It occupies four OFDM symbols in the time domain and 240 subcarriers in the frequency domain. The SSBs in a cell are transmitted in a time-multiplexed pattern, e.g., by transmitting different SSBs on different beams in a beam sweeping fashion. The time-multiplexed set of SSBs is sometimes referred to as an SS burst set. The SSBs in the time-multiplexed set are periodically transmitted, with a periodicity of for example 5, 20, or 80 ms. The maximum number of time multiplexed SSBs within an SS burst set can be up to four for frequencies below 3 GHZ, or eight for frequencies between 3 GHz and 7 GHz or 64 for frequencies above 7 GHZ (FR2). Time domain location of SSB is different for different SSB numerologies. Each SSB carries an SSB index to indicate the relative location of the SSB to the half frame boundary. The network may transmit only a subset of all supported SSBs. The device can be informed of which SSBs are transmitted via broadcast or dedicated RRC signaling.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures (FIGs.) and the detailed description are not to be considered limiting, and other equally effective examples are possible and likely. Furthermore, like reference numerals ("ref.") in the FIGs. indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein. Although various embodiments are described and/or claimed herein in which an apparatus, system, device, etc. and/or any element thereof carries out an operation, process, algorithm, function, etc. and/or any portion thereof, it is to be understood that any embodiments described and/or claimed herein assume that any apparatus, system, device, etc. and/or any element thereof is configured to carry out any operation, process, algorithm, function, etc. and/or any portion thereof.

Communications Networks and Devices

The methods, apparatuses and systems provided herein are well-suited for communications involving both wired and wireless networks. An overview of various types of wireless devices and infrastructure is provided with respect to FIGS. 1A-1D, where various elements of the network may utilize, perform, be arranged in accordance with and/or be adapted and/or configured for the methods, apparatuses and systems provided herein.

Figure 1A:
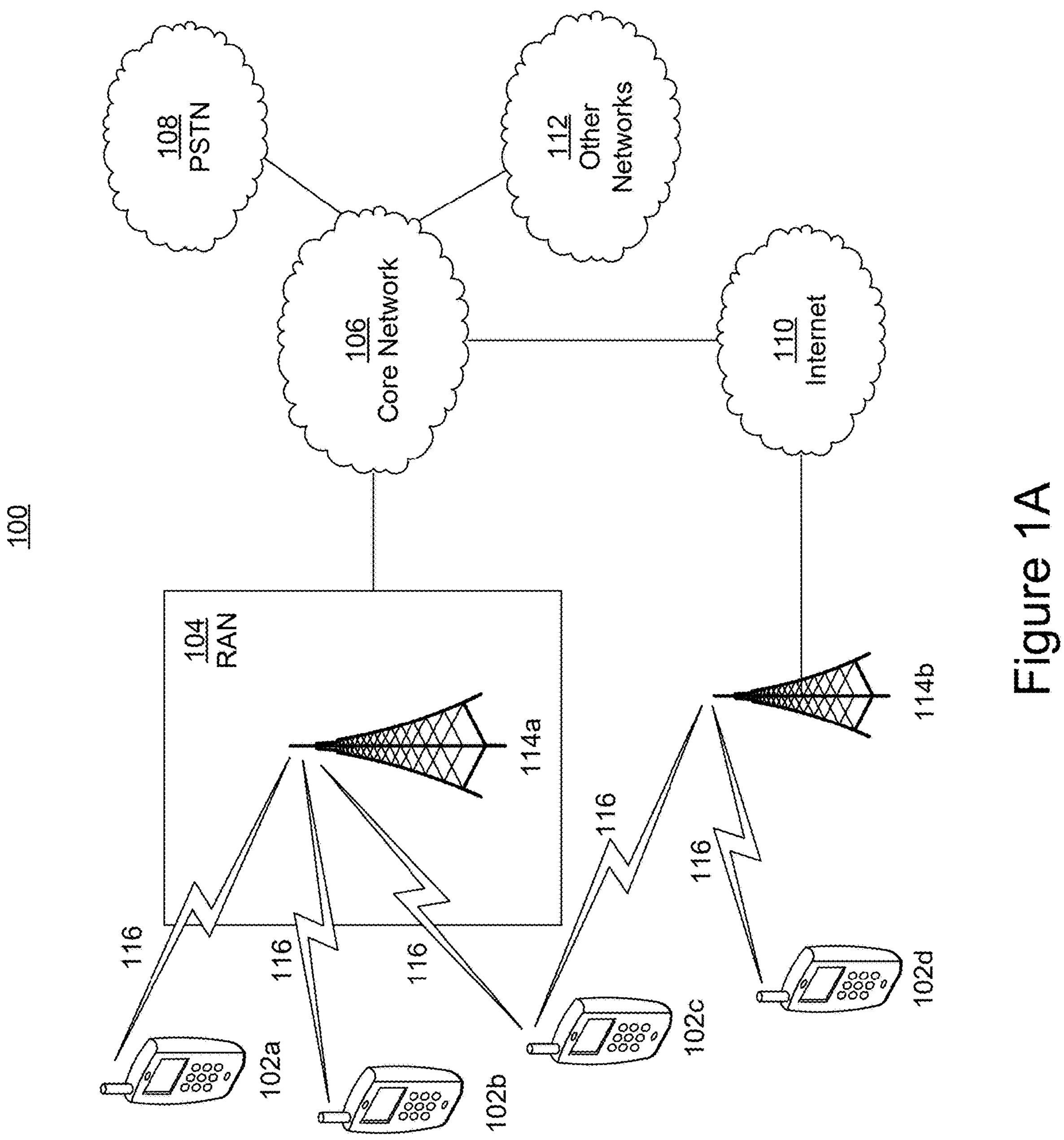
FIG. 1A is a system diagram illustrating an example communications system in which one or more disclosed embodiments may be implemented.

FIG. 1A is a system diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail (ZT) unique-word (UW) discreet Fourier transform (DFT) spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102*a*, 102*b*, 102*c*, 102*d*, a radio access network (RAN) 104/113, a core network (CN) 106/115, a public switched telephone network (PSTN) 108, the Internet 110, and other networks 112, though it will be appreciated that the disclosed embodiments contemplate any number of WTRUs, base stations, networks, and/or network elements. Each of the WTRUs 102*a*, 102*b*, 102*c*, 102*d* may be any type of device configured to operate and/or communicate in a wireless environment. By way of example, the WTRUs 102*a*, 102*b*, 102*c*, 102*d*, any of which may be referred to as a "station" and/or a "STA", may be configured to transmit and/or receive wireless signals and may include (or be) a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102*a*, 102*b*, 102*c* and 102*d* may be interchangeably referred to as a UE.

The communications systems 100 may also include a base station 114*a* and/or a base station 114*b*. Each of the base stations 114*a*, 114*b* may be any type of device configured to wirelessly interface with at least one of the WTRUs 102*a*, 102*b*, 102*c*, 102*d*, e.g., to facilitate access to one or more communication networks, such as the CN 106/115, the Internet 110, and/or the networks 112. By way of example, the base stations 114*a*, 114*b* may be any of a base transceiver station (BTS), a Node-B (NB), an eNode-B (eNB), a Home Node-B (HNB), a Home eNode-B (HeNB), a gNode-B (gNB), a NR Node-B (NR NB), a site controller, an access point (AP), a wireless router, and the like. While the base stations 114*a*, 114*b* are each depicted as a single element, it will be appreciated that the base stations 114*a*, 114*b* may include any number of interconnected base stations and/or network elements.

The base station 114*a* may be part of the RAN 104/113, which may also include other base stations and/or network elements (not shown), such as a base station controller (BSC), a radio network controller (RNC), relay nodes, etc. The base station 114*a* and/or the base station 114*b* may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114*a* may be divided into three sectors. Thus, in an embodiment, the base station 114*a* may include three transceivers, i.e., one for each sector of the cell. In an embodiment, the base station 114*a* may employ multiple-input multiple output (MIMO) technology and may utilize multiple transceivers for each or any sector of the cell. For example, beamforming may be used to transmit and/or receive signals in desired spatial directions.

The base stations 114*a*, 114*b* may communicate with one or more of the WTRUs 102*a*, 102*b*, 102*c*, 102*d* over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114*a* in the RAN 104/113 and the WTRUs 102*a*, 102*b*, 102*c* may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In an embodiment, the base station 114*a* and the WTRUs 102*a*, 102*b*, 102*c* may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114*a* and the WTRUs 102*a*, 102*b*, 102*c* may implement a radio technology such as NR Radio Access, which may establish the air interface 116 using New Radio (NR).

In an embodiment, the base station 114*a* and the WTRUs 102*a*, 102*b*, 102*c* may implement multiple radio access technologies. For example, the base station 114*a* and the WTRUs 102*a*, 102*b*, 102*c* may implement LTE radio access and NR radio access together, for instance using dual connectivity (DC) principles. Thus, the air interface utilized by WTRUs 102*a*, 102*b*, 102*c* may be characterized by multiple types of radio access technologies and/or transmissions sent to/from multiple types of base stations (e.g., an eNB and a gNB).

In an embodiment, the base station 114*a* and the WTRUs 102*a*, 102*b*, 102*c* may implement radio technologies such as IEEE 802.11 (i.e., Wireless Fidelity (Wi-Fi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114*b* in FIG. 1A may be a wireless router, Home Node-B, Home eNode-B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In an embodiment, the base station 114*b* and the WTRUs 102*c*, 102*d* may implement a radio technology such as IEEE 802.11 to establish a wireless local area network (WLAN). In an embodiment, the base station 114*b* and the WTRUs 102*c*, 102*d* may implement a radio technology such as IEEE 802.15 to establish a wireless personal area network (WPAN). In an embodiment, the base station 114*b* and the WTRUs 102*c*, 102*d* may utilize a cellular-based RAT (e.g., WCDMA, CDMA2000, GSM, LTE, LTE-A, LTE-A Pro, NR, etc.) to establish any of a small cell, picocell or femtocell. As shown in FIG. 1A, the base station 114*b* may have a direct connection to the Internet 110. Thus, the base station 114*b* may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102*a*, 102*b*, 102*c*, 102*d*. The data may have varying quality of service (QOS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing an NR radio technology, the CN 106/115 may also be in communication with another RAN (not shown) employing any of a GSM, UMTS, CDMA 2000, WiMAX, E-UTRA, or Wi-Fi radio technology.

The CN 106/115 may also serve as a gateway for the WTRUs 102*a*, 102*b*, 102*c*, 102*d* to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/114 or a different RAT.

Some or all of the WTRUs 102*a*, 102*b*, 102*c*, 102*d* in the communications system 100 may include multi-mode capabilities (e.g., the WTRUs 102*a*, 102*b*, 102*c*, 102*d* may include multiple transceivers for communicating with different wireless networks over different wireless links). For example, the WTRU 102*c* shown in FIG. 1A may be configured to communicate with the base station 114*a*, which may employ a cellular-based radio technology, and with the base station 114*b*, which may employ an IEEE 802 radio technology.

Figure 1B:
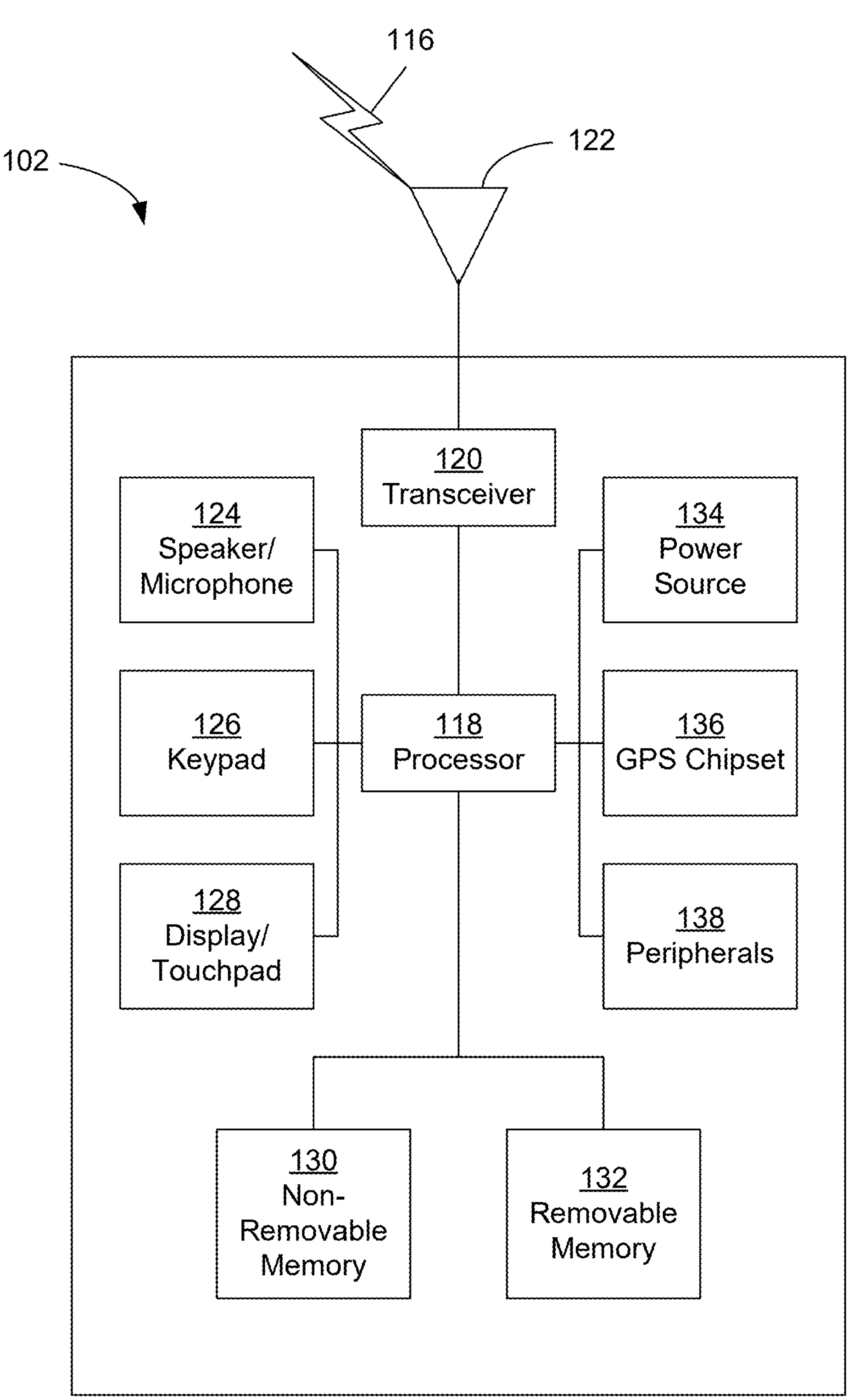
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other elements/peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together, e.g., in an electronic package or chip.

The transmit/receive element 122 may be configured to transmit signals to, or receive signals from, a base station (e.g., the base station 114*a*) over the air interface 116. For example, in an embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In an embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. For example, the WTRU 102 may employ MIMO technology. Thus, in an embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a*, 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other elements/peripherals 138, which may include one or more software and/or hardware modules/units that provide additional features, functionality and/or wired or wireless connectivity. For example, the elements/peripherals 138 may include an accelerometer, an e-compass, a satellite transceiver, a digital camera (e.g., for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a virtual reality and/or augmented reality (VR/AR) device, an activity tracker, and the like. The elements/peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the uplink (e.g., for transmission) and downlink (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the uplink (e.g., for transmission) or the downlink (e.g., for reception).

Figure 1C:
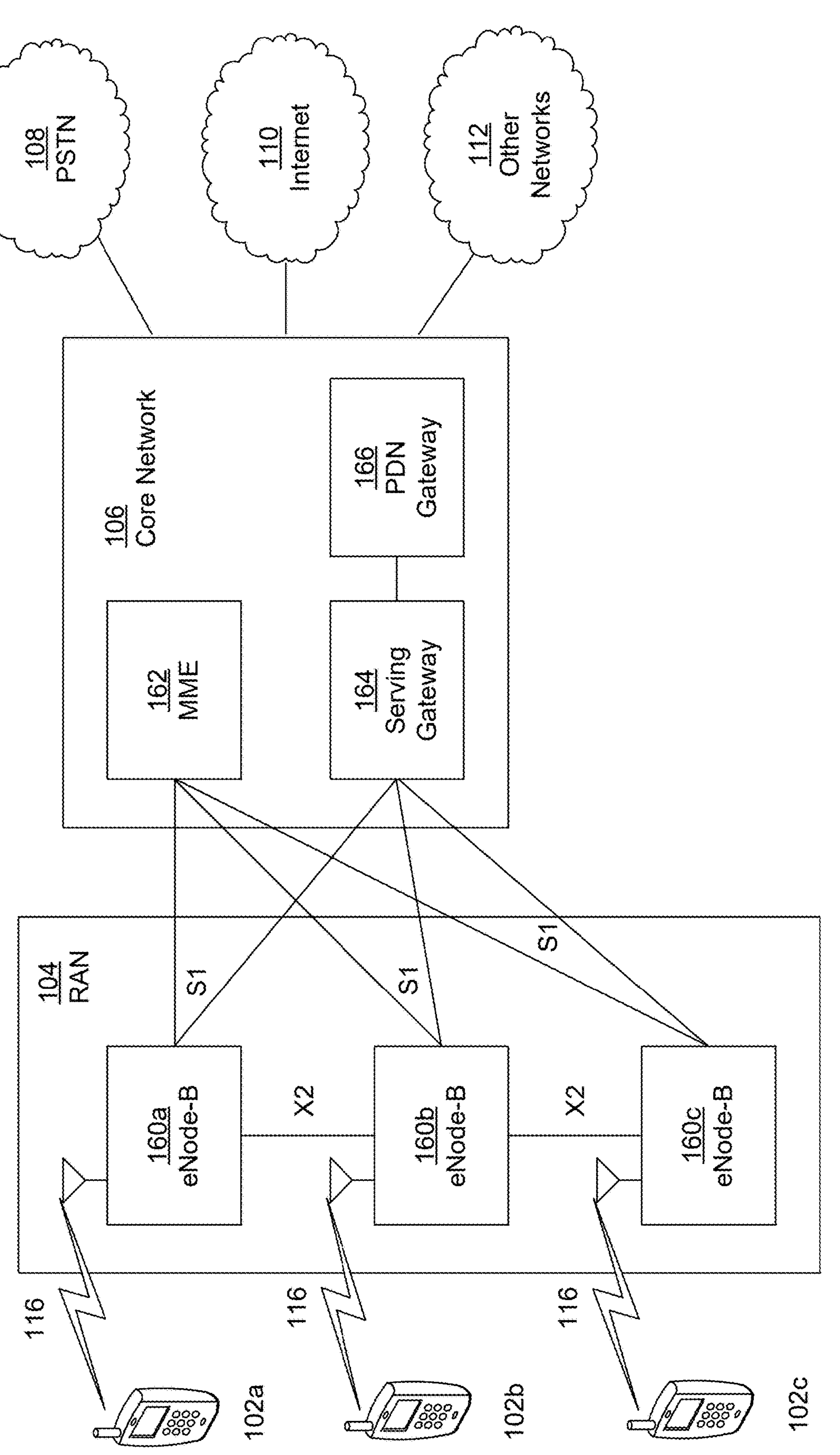
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a*, 102*b*, and 102*c* over the air interface 116. The RAN 104 may also be in communication with the CN 106.

The RAN 104 may include eNode-Bs 160*a*, 160*b*, 160*c*, though it will be appreciated that the RAN 104 may include any number of eNode-Bs while remaining consistent with an embodiment. The eNode-Bs 160*a*, 160*b*, 160*c* may each include one or more transceivers for communicating with the WTRUs 102*a*, 102*b*, 102*c* over the air interface 116. In an embodiment, the eNode-Bs 160*a*, 160*b*, 160*c* may implement MIMO technology. Thus, the eNode-B 160*a*, for example, may use multiple antennas to transmit wireless signals to, and receive wireless signals from, the WTRU 102*a*.

Each of the eNode-Bs 160*a*, 160*b*, and 160*c* may be associated with a particular cell (not shown) and may be configured to handle radio resource management decisions, handover decisions, scheduling of users in the uplink (UL) and/or downlink (DL), and the like. As shown in FIG. 1C, the eNode-Bs 160*a*, 160*b*, 160*c* may communicate with one another over an X2 interface.

The CN 106 shown in FIG. 1C may include a mobility management entity (MME) 162, a serving gateway (SGW) 164, and a packet data network (PDN) gateway (PGW) 166. While each of the foregoing elements are depicted as part of the CN 106, it will be appreciated that any one of these elements may be owned and/or operated by an entity other than the CN operator.

The MME 162 may be connected to each of the eNode-Bs 160*a*, 160*b*, and 160*c* in the RAN 104 via an S1 interface and may serve as a control node. For example, the MME 162 may be responsible for authenticating users of the WTRUs 102*a*, 102*b*, 102*c*, bearer activation/deactivation, selecting a particular serving gateway during an initial attach of the WTRUs 102*a*, 102*b*, 102*c*, and the like. The MME 162 may provide a control plane function for switching between the RAN 104 and other RANs (not shown) that employ other radio technologies, such as GSM and/or WCDMA.

The SGW 164 may be connected to each of the eNode-Bs 160*a*, 160*b*, 160*c* in the RAN 104 via the S1 interface. The SGW 164 may generally route and forward user data packets to/from the WTRUs 102*a*, 102*b*, 102*c*. The SGW 164 may perform other functions, such as anchoring user planes during inter-eNode-B handovers, triggering paging when DL data is available for the WTRUs 102*a*, 102*b*, 102*c*, managing and storing contexts of the WTRUs 102*a*, 102*b*, 102*c*, and the like.

The SGW 164 may be connected to the PGW 166, which may provide the WTRUs 102*a*, 102*b*, 102*c* with access to packet-switched networks, such as the Internet 110, to facilitate communications between the WTRUs 102*a*, 102*b*, 102*c* and IP-enabled devices.

The CN 106 may facilitate communications with other networks. For example, the CN 106 may provide the WTRUs 102*a*, 102*b*, 102*c* with access to circuit-switched networks, such as the PSTN 108, to facilitate communications between the WTRUs 102*a*, 102*b*, 102*c* and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in infrastructure basic service set (BSS) mode may have an access point (AP) for the BSS and one or more stations (STAs) associated with the AP. The AP may have an access or an interface to a distribution system (DS) or another type of wired/wireless network that carries traffic into and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier sense multiple access with collision avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High throughput (HT) STAs may use a 40 MHz wide channel for communication, for example, via a combination of the primary 20 MHz channel with an adjacent or nonadjacent 20 MHz channel to form a 40 MHz wide channel.

Very high throughput (VHT) STAs may support 20 MHZ, 40 MHZ, 80 MHz, and/or 160 MHz wide channels. The 40 MHZ, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse fast fourier transform (IFFT) processing, and time domain processing, may be done on each stream separately. The streams may be mapped on to the two 80 MHz channels, and the data may be transmitted by a transmitting STA. At the receiver of the receiving STA, the above-described operation for the 80+80 configuration may be reversed, and the combined data may be sent to a medium access control (MAC) layer, entity, etc.

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV white space (TVWS) spectrum, and 802.11ah supports 1 MHZ, 2 MHZ, 4 MHZ, 8 MHZ, and 16 MHz bandwidths using non-TVWS spectrum. According to a representative embodiment, 802.11ah may support meter type control/machine-type communications, such as machine-type communications devices in a macro coverage area. machine-type communications devices may have certain capabilities, for example, limited capabilities including support for (e.g., only support for) certain and/or limited bandwidths. The machine-type communications devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., machine-type communications type devices) that support (e.g., only support) a 1 MHz mode, even if the AP, and other STAs in the BSS support 2 MHZ, 4 MHZ, 8 MHZ, 16 MHz, and/or other channel bandwidth operating modes. Carrier sensing and/or network allocation vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
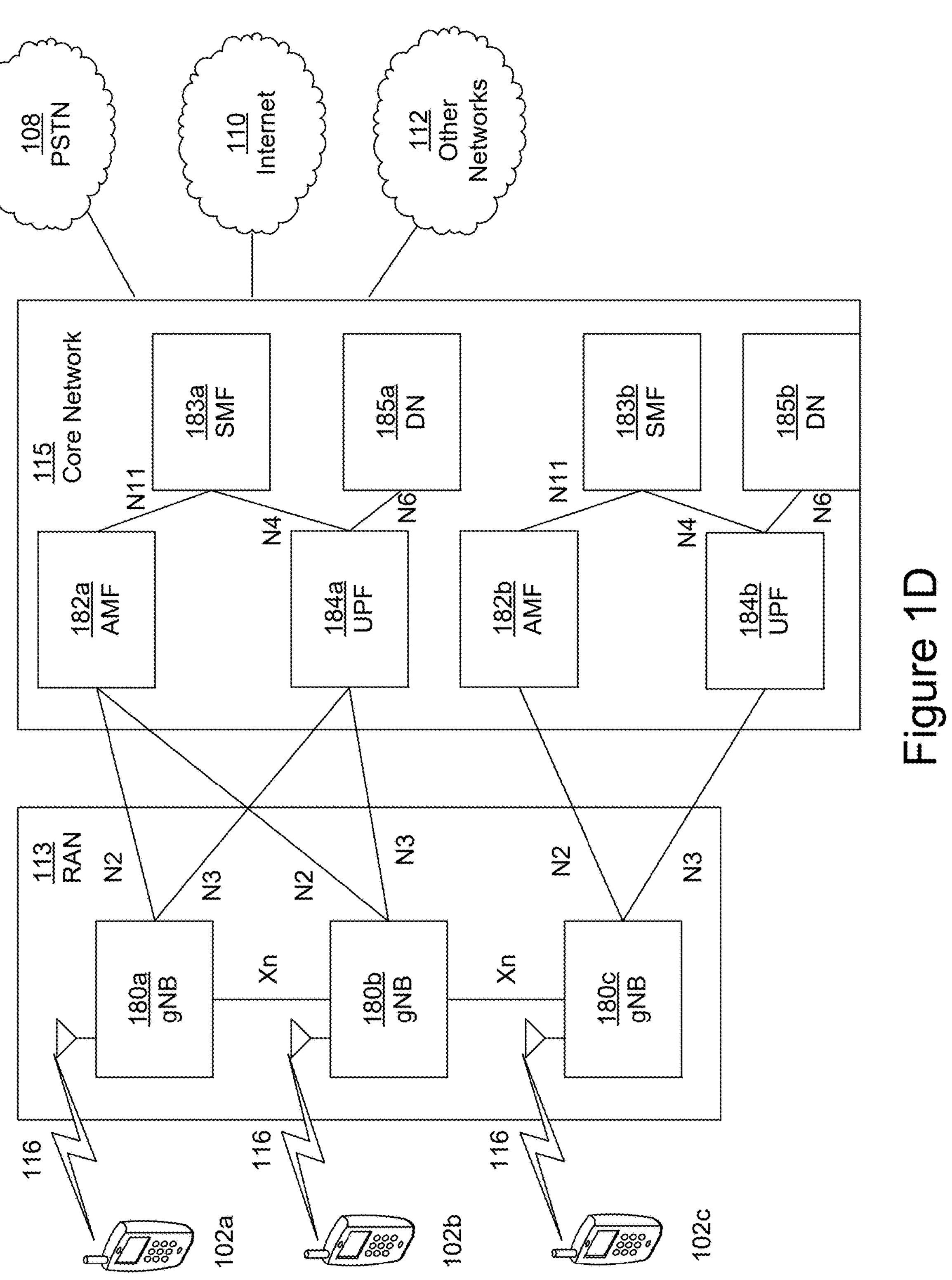
FIG. 1D is a system diagram illustrating a further example RAN and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102*a*, 102*b*, 102*c* over the air interface 116. The RAN 113 may also be in communication with the CN 115.

The RAN 113 may include gNBs 180*a*, 180*b*, 180*c*, though it will be appreciated that the RAN 113 may include any number of gNBs while remaining consistent with an embodiment. The gNBs 180*a*, 180*b*, 180*c* may each include one or more transceivers for communicating with the WTRUs 102*a*, 102*b*, 102*c* over the air interface 116. In an embodiment, the gNBs 180*a*, 180*b*, 180*c* may implement MIMO technology. For example, gNBs 180*a*, 180*b* may utilize beamforming to transmit signals to and/or receive signals from the WTRUs 102*a*, 102*b*, 102*c*. Thus, the gNB 180*a*, for example, may use multiple antennas to transmit wireless signals to, and/or receive wireless signals from, the WTRU 102*a*. In an embodiment, the gNBs 180*a*, 180*b*, 180*c* may implement carrier aggregation technology. For example, the gNB 180*a* may transmit multiple component carriers to the WTRU 102*a* (not shown). A subset of these component carriers may be on unlicensed spectrum while the remaining component carriers may be on licensed spectrum. In an embodiment, the gNBs 180*a*, 180*b*, 180*c* may implement Coordinated Multi-Point (COMP) technology. For example, WTRU 102*a* may receive coordinated transmissions from gNB 180*a* and gNB 180*b* (and/or gNB 180*c*).

The WTRUs 102*a*, 102*b*, 102*c* may communicate with gNBs 180*a*, 180*b*, 180*c* using transmissions associated with a scalable numerology. For example, OFDM symbol spacing and/or OFDM subcarrier spacing may vary for different transmissions, different cells, and/or different portions of the wireless transmission spectrum. The WTRUs 102*a*, 102*b*, 102*c* may communicate with gNBs 180*a*, 180*b*, 180*c* using subframe or transmission time intervals (TTIs) of various or scalable lengths (e.g., including a varying number of OFDM symbols and/or lasting varying lengths of absolute time).

The gNBs 180*a*, 180*b*, 180*c* may be configured to communicate with the WTRUs 102*a*, 102*b*, 102*c* in a standalone configuration and/or a non-standalone configuration. In the standalone configuration, WTRUs 102*a*, 102*b*, 102*c* may communicate with gNBs 180*a*, 180*b*, 180*c* without also accessing other RANs (e.g., such as eNode-Bs 160*a*, 160*b*, 160*c*). In the standalone configuration, WTRUs 102*a*, 102*b*, 102*c* may utilize one or more of gNBs 180*a*, 180*b*, 180*c* as a mobility anchor point. In the standalone configuration, WTRUs 102*a*, 102*b*, 102*c* may communicate with gNBs 180*a*, 180*b*, 180*c* using signals in an unlicensed band. In a non-standalone configuration WTRUs 102*a*, 102*b*, 102*c* may communicate with/connect to gNBs 180*a*, 180*b*, 180*c* while also communicating with/connecting to another RAN such as eNode-Bs 160*a*, 160*b*, 160*c*. For example, WTRUs 102*a*, 102*b*, 102*c* may implement DC principles to communicate with one or more gNBs 180*a*, 180*b*, 180*c* and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards user plane functions (UPFs) 184*a*, 184*b*, routing of control plane information towards access and mobility management functions (AMFs) 182*a*, 182*b*, and the like. As shown in FIG. 1D, the gNBs 180*a*, 180*b*, 180*c* may communicate with one another over an Xn interface.

The CN 115 shown in FIG. 1D may include at least one AMF 182*a*, 182*b*, at least one UPF 184*a*, 184*b*, at least one session management function (SMF) 183*a*, 183*b*, and at least one Data Network (DN) 185*a*, 185*b*. While each of the foregoing elements are depicted as part of the CN 115, it will be appreciated that any of these elements may be owned and/or operated by an entity other than the CN operator.

The AMF 182*a*, 182*b* may be connected to one or more of the gNBs 180*a*, 180*b*, 180*c* in the RAN 113 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of NAS signaling, mobility management, and the like. Network slicing may be used by the AMF 182*a*, 182*b*, e.g., to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for machine-type communications access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as Wi-Fi.

The SMF 183*a*, 183*b* may be connected to an AMF 182*a*, 182*b* in the CN 115 via an N11 interface. The SMF 183*a*, 183*b* may also be connected to a UPF 184*a*, 184*b* in the CN 115 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing downlink data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 113 via an N3 interface, which may provide the WTRUs 102*a*, 102*b*, 102*c* with access to packet-switched networks, such as the Internet 110, e.g., to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102*a*, 102*b*, 102*c* with access to the other networks 112, which may include other wired and/or wireless networks that are owned and/or operated by other service providers. In an embodiment, the WTRUs 102*a*, 102*b*, 102*c* may be connected to a local Data Network (DN) 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to any of: WTRUs 102*a-d*, base stations 114*a-b*, eNode-Bs 160*a-c*, MME 162, SGW 164, PGW 166, gNBs 180*a-c*, AMFs 182*a-b*, UPFs 184*a-b*, SMFs 183*a-b*, DNs 185*a-b*, and/or any other element(s)/device(s) described herein, may be performed by one or more emulation elements/devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

Hereinafter, “a” and “an” and similar phrases are to be interpreted as “one or more” and/or “at least one”. Similarly, any term which ends with the suffix “(s)” is to be interpreted as “one or more” and/or “at least one”. The term “may” is to be interpreted as “may, for example” or “for example”.

Overview

Synchronization Signals in 5G NR

In 5G new radio (NR), when a device starts initial access or decides to transition from idle/inactive state to active state, the device searches for SS/PBCH blocks (SSBs) which are periodically transmitted by the network. An SS/PBCH Block comprises a Primary Synchronization Signal (PSS), Secondary Synchronization Signal(s) (SSS), and a Physical Broadcast Channel (PBCH). It occupies four OFDM symbols in the time domain and 240 subcarriers in the frequency domain. The SSBs in a cell are transmitted in a time-multiplexed pattern, e.g., by transmitting different SSBs on different beams in a beam sweeping fashion. The time-multiplexed set of SSBs is sometimes referred to as an SS burst set. The SSBs in the time-multiplexed set are periodically transmitted, with a periodicity of for example 5, 20, or 80 ms. The maximum number of time multiplexed SSBs within an SS burst set can be up to four for frequencies below 3 GHZ, or eight for frequencies between 3 GHz and 7 GHz or 64 for frequencies above 7 GHZ (FR2). Time domain location of SSB is different for different SSB numerologies. Each SSB carries an SSB index to indicate the relative location of the SSB to the half frame boundary. The network may transmit only a subset of all supported SSBs. The device can be informed of which SSBs are transmitted via broadcast or dedicated RRC signaling.

Initial Access in 5G NR

In NR, there are three PSS sequences (same as in LTE) with corresponding PSS sequence IDs. NR PSS is generated by using a BPSK modulated m-sequence of length 127. M-sequence is used to address time/frequency offset ambiguity problem encountered in Zadoff-Chu sequence used in LTE. PSS is used for coarse time/frequency synchronization. The PSS sequence Id is also one of the factors determining Physical Cell ID (PCI). A WTRU implementation may run parallel and/or sequential correlators to detect PSS, with different time and/or frequency offsets.

There are 336 SSS sequences in NR with corresponding SSS sequence Ids. After detecting PSS, at least the coarse timing and frequency of SSS is known, given that the WTRU may assume that PSS and SSS are transmitted on the same antenna port. If an SSS is detected, the PCI can be determined. The PCI is needed to demodulate PBCH, e.g., to determine the frequency-domain position of PBCH DMRS.

The SSB index (0-3, 0-7, or 0-63, depending on frequency range) may be derived by the WTRU as two parts: an implicit part encoded in the PBCH DMRS sequence and in the scrambling applied to the PBCH and an explicit part included in the PBCH payload.

Single Carrier Frequency Domain Equalization (SC-FDE)

Single carrier with frequency domain equalization (SC-FDE) uses a single carrier waveform that, compared to OFDM, avoids an IDFT operation at transmitter, and thereby improved PAPR characteristics, robustness to phase noise and low-resolution ADC/DAC. Although both OFDM and SC-FDE use a single DFT block and a single IDFT block (same overall complexity), the SC-FDE IDFT operation happens at the receiver. The higher power efficiency of the SC-FDE transmitter can translate into an increase in cell coverage area. Due to its single carrier nature, SC-FDE does not provide means for frequency multiplexing (within an SC-FDE carrier) although other multiplexing means (time, space, polarization, etc.) are still applicable.

Figure 2:
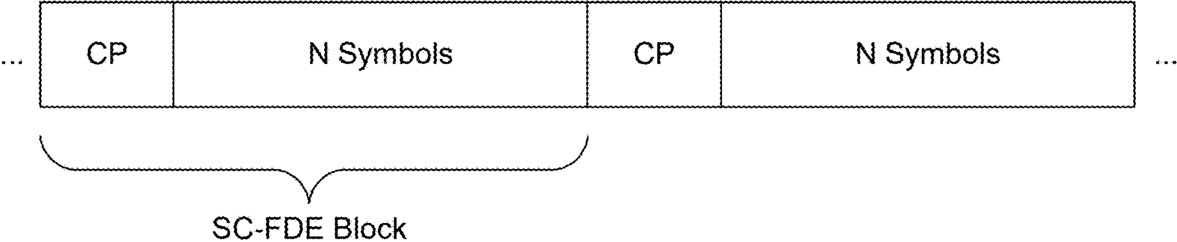
FIG. 2 is a diagram illustrating an example of SC-FDE blocks.

To enable frequency domain equalization using DFT/IDFT, similar to OFDM, SC-FDE systems may typically use a cyclic prefix (CP) with a duration that is longer than the channel. N symbols plus a CP forms an SC-FDE block, as illustrated in FIG. 2.

Figure 3:
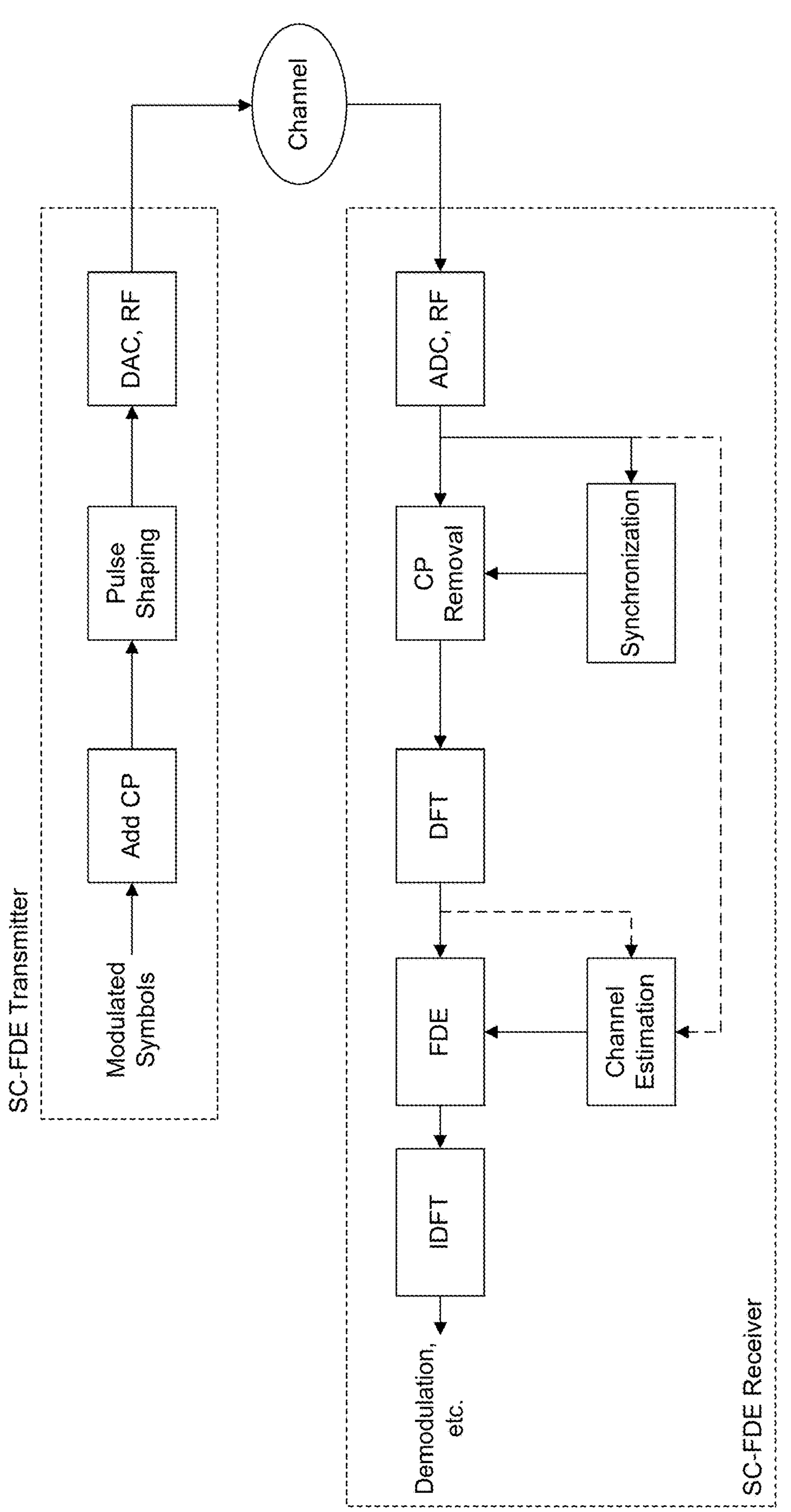
FIG. 3 is a diagram illustrating an example of SC-FDE transmitter and receiver, according to one or more embodiments.
Figure 4:
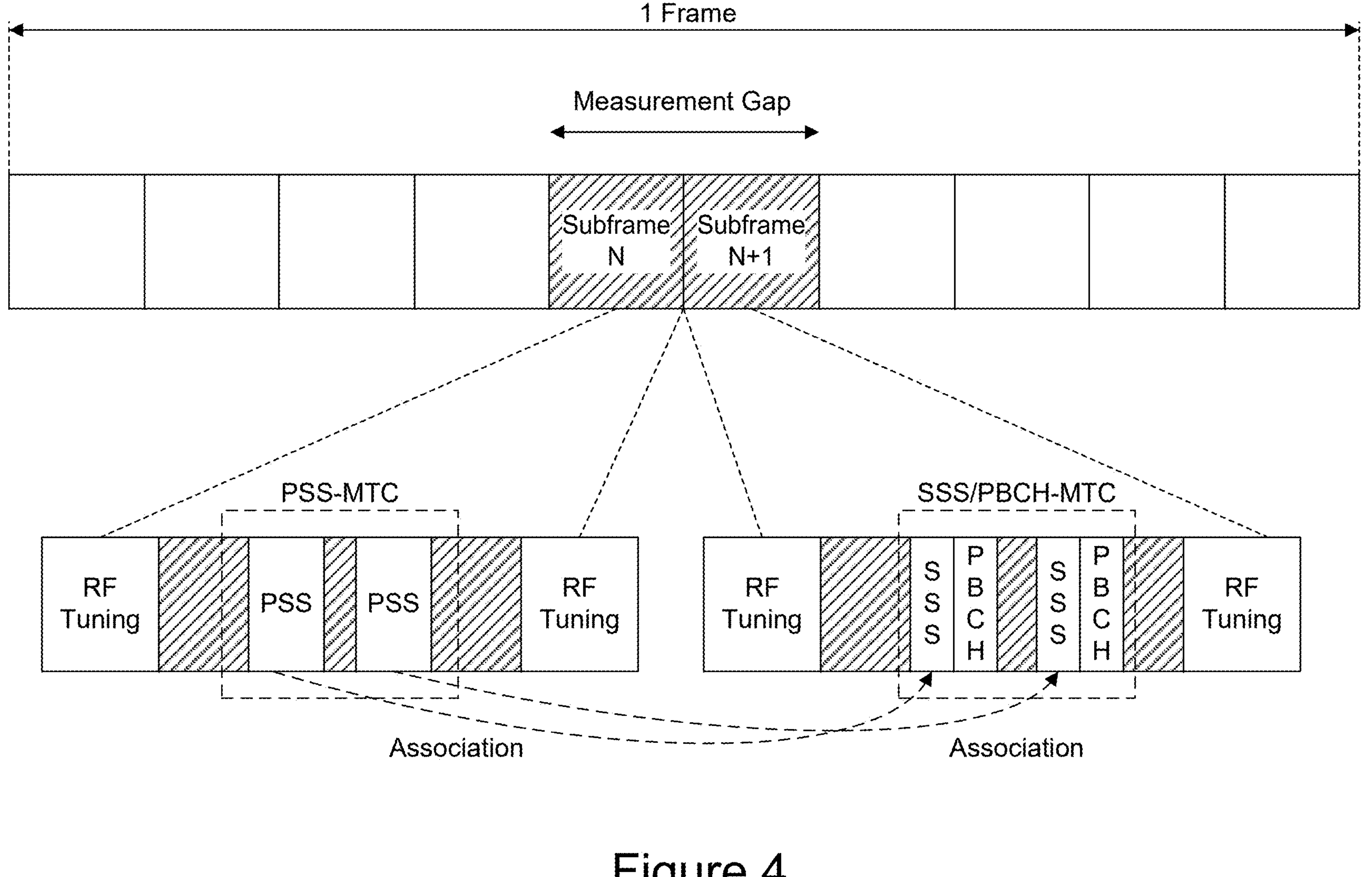
FIG. 4 is a diagram illustrating an example of two separate measurement configurations for PSS and SSS, according to one or more embodiments.

In OFDM, demodulation and detection are performed in the frequency domain. In SC-FDE, demodulation and detection are performed in the time domain, after FDE. An exemplary SC-FDE transmitter and receiver is illustrated in FIG. 3. The DFT and IDFT size should preferably match the number of symbols in the SC-FDE block (e.g., "N" symbols in FIG. 2).

Measurement Gaps, Measurement Timing Configuration, and Events in 5G NR

A WTRU may need measurement gaps (MG) as it cannot perform inter-frequency or inter-RAT measurement while transmitting/receiving. Inter-frequency measurement is required if it is performed outside of WTRU's current active BWP. The network configures the measurement gaps for the WTRU via RRC signaling. During measurement gap, the WTRU is not required to receive or transmit in the serving cell. There are two types of measurement gaps: per-WTRU and per-RF. Per RF measurement gap has two gap patterns FR1 gap and FR2 gap. Per-RF gaps are required due to separate RF chain support by WTRU. When either gapFR1 or gapFR2 is configured, gapUE can't be configured for the WTRU (i.e., gapUE can be used for measurements in both FR1 and FR2.)

The network may inform the WTRU about the timing of neighbor cell SSBs via SSB Measurement Timing Configuration (SMTC). SMTC is contained within the MG. SMTC periodicity can be longer than the SSB periodicity, e.g., if channel conditions are good, mobility is low, etc.

A set of predefined measurement reporting mechanisms called "events" can be configured. WTRU measures serving and neighbor cell quantities and compare with the threshold, offset, etc., for the event. The report quantity/the trigger for event can be RSRP, RSRQ or SINR.

INTRODUCTION

An SC-FDE sub-THz system brings the following unique aspects from the SSB/RRM measurements perspective. In SC-FDE, signals need to be multiplexed in time-domain due to lack of FDM. Power consumption at a WTRU is a bigger challenge in sub-THz spectrum with very wide channel bandwidths. This may imply that a synchronization signal with low symbol rate (narrow bandwidth) would be beneficial. Sub-THz system may require a significantly larger number of SSBs/beams for coverage resulting in longer time for beam sweeping for synchronization and RRM measurement. Given the properties of sub-THz communications, non-standalone (NSA) may be a preferred deployment scenario, at least initially with spotty sub-THz coverage. In a non-standalone (NSA) deployment, a WTRU may be connected to a PCell in a lower frequency band, e.g., FR1-3, while accessing an SC-FDE sub-THz carrier when a sub-THz SC-FDE SCell/PSCell is available.

Therefore, new or enhanced methods and procedures may be desired to design efficient and useful RRM measurements for a non-standalone SC-FDE sub-THz carrier taking their unique characteristics into account.

General Context and Sub-Problems: Synchronization Signal Framework for SC-FDE

The radio resource overhead of a narrowband synchronization signal is significantly higher in SC-FDE systems, since a narrowband synchronization signal prevents transmission of other signals over the whole bandwidth for the duration of the synchronization signal transmission. In contrast, in OFDM-based systems, other transmissions can be frequency multiplexed during narrowband synchronization signal transmission, thereby reducing the effective overhead of the OFDM-based synchronization signals.

In an example numerical comparison, it is assumed a similar PSS bandwidth and PSS duration for an SC-FDE based system as an OFDM-based system (as in 5G NR). The example analysis indicates that PSS/SSS/PBCH overhead for SC-FDE in the order of 12× more than that of the NR CP-OFDM system (e.g., 16.5% system overhead for SC-FDE vs 1.3% for CP-OFDM).

Furthermore, the long duration of a PSS/SSS/PBCH burst means that a WTRU needs to perform PSS detection during a longer time window, resulting in higher WTRU power consumption, etc. Therefore, there is a need for a flexible SC-FDE synchronization signal bandwidth design that achieves higher spectrum utilization and reduces overhead.

For example, consider a system with narrowband PSS and wideband SSS/PBCH. Such system would allow the WTRU to consume less power for narrowband PSS based cell search due to lower sampling rate during the PSS detection. Less time would also be required for wideband SSS/PBCH transmission. The wideband SSS/PBCH would also allow for higher synchronization and measurement accuracy for SSS-based measurement.

In NR, PSS, SSS and PBCH are transmitted together in an SSB. For the considered single-carrier system, however, it may be beneficial to reduce the symbol rate switching between narrowband PSS and wideband SSS/PBCH by introducing a narrowband PSS burst (in a PSS Measurement Timing Configuration (MTC) window) and a wideband SSS/PBCH burst (in an SSS MTC) that are separate in time. Furthermore, a separate PSS burst (in a PSS-MTC window) may be more compact in time and thereby give a shorter time during which PSS detection needs to be performed. FIG. 3 shows an example of two separate PSS and SSS bursts, each with its own MTC.

Since it is assumed that PSS and SSS are separate in time, it may be beneficial to configure a WTRU with only a PSS-MTC, but not an SSS-MTC, for instance for initial RRM measurements on an SC-FDE carrier. Not configuring an SSS-MTC can shorten the WTRU measurement gap, reduce the WTRU measurement effort, as well as allowing the network to stop transmitting SSS/PBCH during some periods.

Coverage on a sub-THz carrier is likely spottier than in lower frequency ranges. The network may want the WTRU to perform SSS-based measurements only if the corresponding PSS measurement is good enough. A baseline solution could be that the network configures/releases a corresponding SSS-MTC, which involves associated RRC signaling overhead and delay. Therefore, new or enhanced methods and procedures may be desired to design more efficient enabling/disabling of SSS-based measurement in an SSS-MTC that also allows the network to deactivate SSS transmission when no WTRU performs SSS-based measurement in an area.

In some examples, the WTRU may receive, detect, synchronize to, and/or measure, SSS(s) without the prior reception, detection, synchronization to, and/or measurement of associated PSS(s). For example, a WTRU may be configured with sufficiently detailed and accurate information (e.g., in an SSS-MTC) on the time location of the SSS(s) in relation to a serving cell timing as well as sufficiently detailed and accurate information on the frequency location of the SSS(s) (e.g., a radio frequency channel number).

Representative Procedure for Event-Triggered SSS Reporting Activation/Deactivation In one embodiment, a WTRU may be configured with PSS-based measurement and reporting, e.g., for a PSS-MTC (e.g., in a measurement object). In an example, the PSS-MTC may be associated with a first WTRU measurement gap. In an example, the WTRU is configured with a PSS-based event E1 that is associated with SSS-MTC activation.

The WTRU may be also configured with SSS-based measurement and reporting, e.g., for an SSS-MTC that is associated with the PSS-MTC (e.g., in the measurement object). In an example, the SSS-MTC is inactive upon configuration, e.g., the WTRU doesn't perform the corresponding SSS-based measurement and reporting. In an example, the SSS-MTC may be associated with a second WTRU measurement gap. In some cases, the WTRU is configured with an SSS-based event E2 that is associated with SSS-MTC deactivation. Event E2 may include a criterion based on the overall SSS-based quality of a carrier, e.g., maximum across cells, beams, etc. Event E2 may also include a criterion based on the PSS-based metric used for event E1.

In an example, the WTRU performs PSS-based measurement based on (or using) the PSS-MTC. The WTRU may determine that event E1 is triggered. The WTRU may report that the event E1 is triggered (explicitly or implicitly), e.g., by transmitting a PSS-based measurement report.

In an example, a time delay T1 (may be 0 or greater than 0, or a time offset being 0 or greater than 0) after the report transmission, the WTRU activates the associated SSS-based measurement and reporting based on the SSS-MTC. In an example, activation of SSS-MTC may also result in deactivation of associated PSS-based reporting. In an example, activation of SSS-MTC may also result in activation/adjustment of corresponding WTRU measurement gap, after a time delay T2 which starts from the report being transmitted.

In an example, the WTRU performs SSS-based measurement based on the SSS-MTC. The WTRU may determine that event E2 is triggered. The WTRU reports that the event E2 is triggered (explicitly or implicitly), e.g., by transmitting an SSS-based measurement report.

A time delay T3 (may be 0 or greater than 0, or a time offset being 0 or greater than 0) after the report transmission, the WTRU deactivates the associated SSS-based measurement and reporting based on the SSS-MTC. In an example, deactivation of SSS-MTC may also result in activation of associated PSS-based reporting. In an example, deactivation of SSS-MTC may also result in deactivation/adjustment of corresponding WTRU measurement gap, after a time delay T4 after the report transmission.

Figure 5:
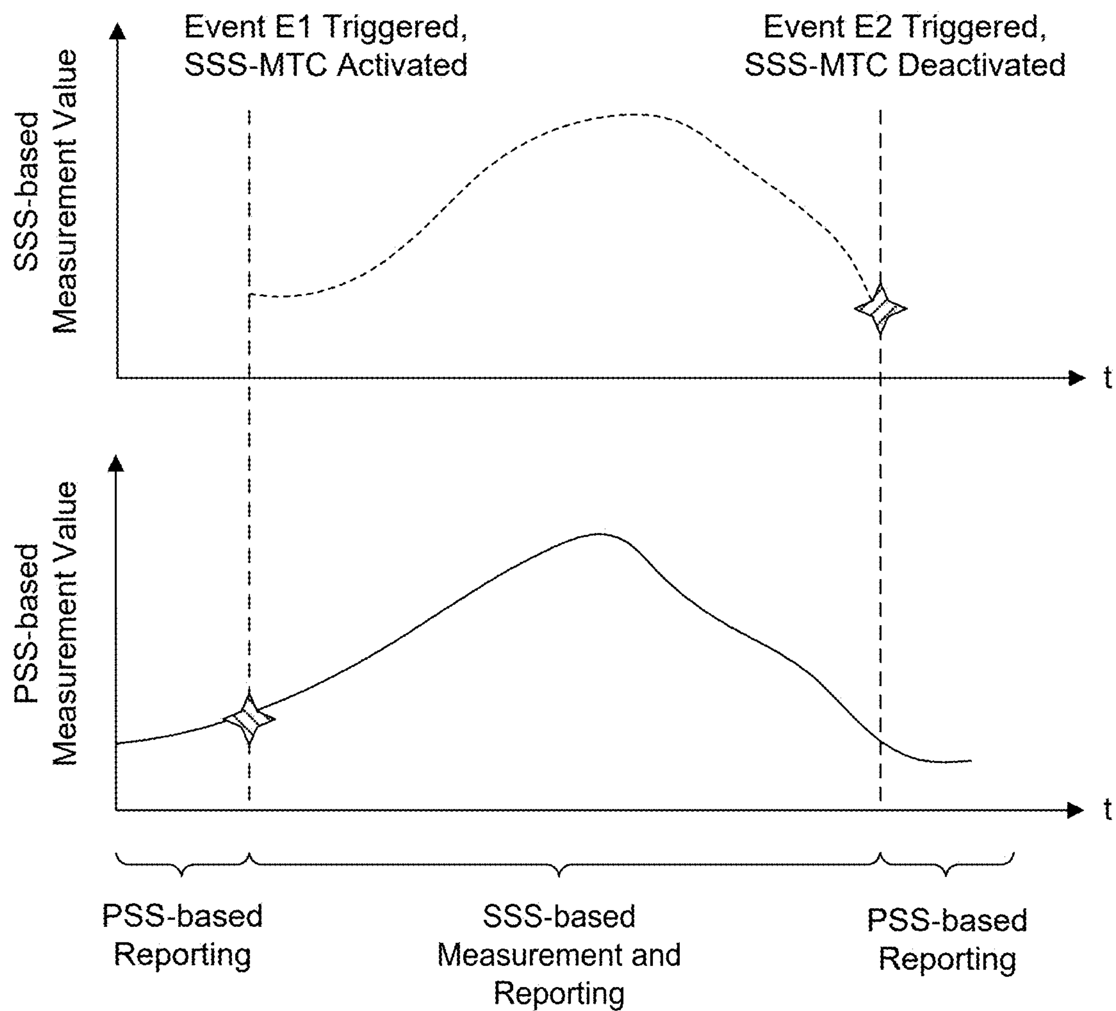
FIG. 5 is a diagram illustrating an example of activation and deactivation of SSS-based measurement and reporting, according to one or more embodiments.
Figure 6:
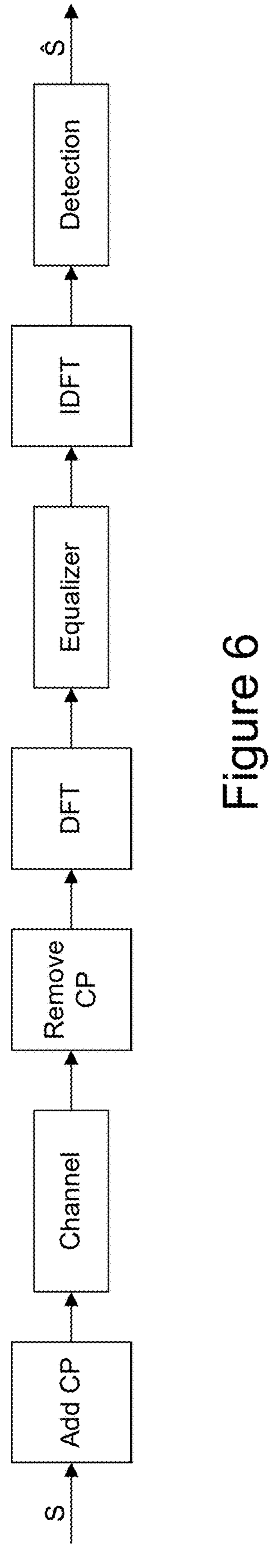
FIG. 6 is a block diagram illustrating an example of SC-FDE based transmission and reception, according to one or more embodiments.

Referring to FIG. 5, in an example, the WTRU is configured with triggering condition(s) or event(s) upon which the WTRU may switch from PSS-based measurement and reporting to SSS-based. In addition, the WTRU is configured with triggering condition(s) or event(s) upon which the WTRU may switch back from SSS-based measurement and reporting to PSS-based reporting.

SC-FDE Based Transmission and Reception

In an example, at an SC-FDE transmitter, groups of $Log_2M$ data bits are mapped into complex symbols in an M-ary complex constellation. Then, N symbols are grouped into blocks and sent to the encoder. A cyclic prefix (CP) is added to each block, by prefixing a copy of its last $N_{CP}$ symbols. This prevents Inter-block interference (IBI) but wastes bandwidth and is energy inefficient. It introduces short term periodicity which makes the linear convolution of the channel impulse response look like a circular convolution. Circular convolution in the time domain is useful as it translates into multiplication in the frequency domain. The CP extended blocks are fed to a parallel to serial converter, a digital to analog convertor, frequency up-convertor and a filter before it gets transmitted over the wireless channel. At the receiver, the signal is fed to a frequency down-converter, a filter and analog to digital converter. The output sequence of samples is grouped into blocks again. For each block, CP is discarded, and the remaining samples are sent to an FFT block for conversion to frequency domain. Then, a frequency domain equalizer (FDE) is used to compensate for channel distortion. The output symbols are fed to an IFFT block for conversion to the time domain.

SC-FDE transmitted signal Bandwidth is proportional to the symbol rate. The SC-FDE block duration depends on symbol rate, assumed receiver DFT/IDFT size, and CP. The SC-FDE block duration may be given by Equation 1: block duration=(DFT size)/(symbol rate)+CP duration.

$$\text{block duration}=\text{DFT size}/\text{symbol rate}+\text{CP duration} \quad \text{(Equation 1)}$$

The CP duration should accommodate communication channel time dispersion, time synchronization errors, etc. It consists of an integer number of symbols that is less than the assumed receiver DFT/IDFT size. For a fixed CP duration (in seconds) and DFT/IDFT size, CP overhead grows with symbol rate, i.e., with shorter SC-FDE block duration.

Synchronization Raster for SC-FDE Based Cell Search and Synchronization

A synchronization signal may be transmitted on a certain frequency, e.g., the center frequency of the signal, and a certain signal bandwidth. In order to limit the number of center frequency hypotheses, a WTRU may assume that a synchronization signal is transmitted on a frequency that belongs to a synchronization raster. A synchronization raster may be a set of frequency points, e.g., corresponding to center frequencies, that may be defined in a specification or configured to a WTRU.

A synchronization raster may comprise a set of frequency points for a frequency band that are uniformly or non-uniformly spaced (separated) within the band. The frequency spacing may be the same in different bands, e.g., adjacent bands, or different. A WTRU may determine a set of synchronization raster points by using an equation, where the parameters in the equation may be defined in a specification or configured. Alternatively, the WTRU may determine a set of synchronization raster points from a table, that may be defined in a specification or configured to the WTRU.

In some cases, a synchronization signal may be transmitted with a center frequency that is offset from a synchronization raster frequency, where the offset may be configurable and/or belong a predefined set of offsets (e.g., 1, 2, 3, or 4 offsets, potentially including offset 0).

The synchronization raster and synchronization raster point concepts are used in various solution herein. However, these terms could also be understood to represent, more generally, a particular carrier frequency, which does not necessarily lie on a synchronization raster, for example, as represented by an ARFCN.

The term synchronization frequency is used herein to represent a frequency, e.g., carrier frequency, on which a WTRU performs cell search, synchronization signal detection, synchronization signal based measurements, synchronization, etc. A synchronization frequency may correspond to a synchronization raster point, an ARFCN, etc., e.g., as discussed above.

Note that a WTRU performing an operation on a synchronization frequency may include the WTRU performing an operation on the synchronization frequency plus/minus a frequency offset that is typically small in relation to the synchronization frequency. A synchronization signal may be received slightly off the synchronization frequency due to Doppler shifts, imperfect oscillators, etc.

PSS in an SC-FDE System

For PSS reception, etc., a WTRU may assume the following in various combinations.

One or more PSS sequences may be defined.

In some cases, the different PSS sequences may be based on different cyclic shifts of a single sequence. The different PSS sequences may be associated with different parameter values, e.g., different index values. In some cases, the parameter value may be directly used to determine the cyclic shift.

In some cases, the different PSS sequences may be generated using different initialization values, e.g., for a shift register or a pseudo-random sequence generator.

The modulated symbols may be pulse shaped using a pulse or a filter, which may be associated with one or more parameters, such as a roll off factor. The roll off factor may have a value between 0 and 1, where small roll off factor may correspond to steeper roll off in the pulse frequency response, while resulting in higher peak-to-average-power ratio (PAPR). Example pulses include raised cosine, such as the root raised cosine. In some cases, the WTRU may use a matched filter in its receiver, where the filter may be matched to the pulse/filter at the transmitter, e.g., a root raised cosine filter.

The block of PSS symbols may be prepended or appended with a CP, a unique word (a predefined sequence of symbols), or zeros. In some cases, PSS symbols are not prepended or appended in such a way. Henceforth, the term CP will be used to denote a prepended or appended CP, unique word, zeros, or similar.

The baseband symbols, including CP, if any, are up converted and transmitted on the PSS frequency, e.g., on a synchronization raster point. The PSS symbols are transmitted at a symbol rate, e.g., at a certain number of symbols per second. The bandwidth occupied by the PSS, e.g., the x dB bandwidth (x is for instance 3, 6, etc.), may depend on multiple factors, such as the PSS symbol rate and the used roll off factor.

SC-FDE Based SSS

The term SSS/PBCH used herein may refer to SSS and/or PBCH.

Representative Procedure for Event-Triggered Activation/Deactivation of SSS-Based Measurement and Reporting In one embodiment, an SSS that is associated with a detected PSS may be located at an offset TSSS1 from the detected PSS. The WTRU may receive an RRC configuration that defines the offset TSSS1. The WTRU may be configured with the following:

Event E1: a PSS measurement value is above a certain threshold TH1.

Event E2: an SSS measurement value is below a certain threshold TH2.

Timer T1: time delay after which the WTRU activates the associated SSS-based measurement and reporting, e.g., based on the SSS-MTC Timer T3: time delay after which WTRU deactivates the associated SSS-based measurement and reporting, e.g., based on the SSS-MTC The events E1 and E2 may be configured to be associated with one or more PSS reporting configuration(s), PSS MTC(s), SSS reporting config(s), and/or SSS MTC(s). The configuration of an event may comprise the report configuration ID(s) of the associated SSS and/or PSS reporting configuration(s). The configuration of an event may comprise one or more MTC Id(s) of the associated SSS MTC(s) and/or PSS MTC(s) or one or more measurement object Id(s) of the measurement object(s) that includes the configuration of the associated SSS MTC(s) and/or PSS MTC(s). Alternatively, the reporting configuration(s), MTC configuration(s), etc., may include an association to one or more events, for instance through event ID(s), e.g., an event for activation and an event for deactivation.

Note that an MTC may comprise a time window in relation to a serving cell, e.g., the serving cell that provided the configuration or a primary cell. The time window may comprise a periodicity and a duration. The term MTC used herein may also be understood as the corresponding time window.

In an example, SSS based measurement and reporting and SSS-MTC may be inactive upon configuration. After the WTRU determines event E1 is triggered, the WTRU may take one or more of the following actions: 1) activate SSS MTC and/or associated SSS based measurement and reporting; 2) deactivate associated PSS based reporting; and/or 3) start T1 timer.

In another example, after the activation of SSS-based measurement and reporting, the WTRU determines if event E2 is triggered. When event E2 is triggered, the WTRU may take one or more of the following actions: 1) deactivate SSS MTC and/or associated SSS based measurement and reporting; 2) activate associated PSS based reporting; and/or 3) start T3 timer.

After the transmission of the PSS based measurement report, the WTRU may start a timer T1, after which the WTRU activates the associated SSS-based measurement and reporting, e.g., based on the SSS-MTC. This time delay T1 ensures that the network has received the report and is aware of the activation of the SSS-MTC at the WTRU side. The activated SSS-based measurement and reporting may correspond to one or more SSS reporting configurations, for example periodic, semi-persistent, or event-based reporting. One of the reporting configurations may correspond to the reporting associated with event E2. Other reporting configurations may correspond to other events. For deactivated periodic SSS-based reporting, the UE may omit transmitting the periodic measurement report, until it is activated. For semi-persistent reporting, it may follow legacy activation/deactivation procedures, such as DCI-based or MAC CE based activation/deactivation, in addition to the activation/deactivation proposed herein (based on events). For example, semi-persistent reporting may be activated only if it is activated both based on legacy activation and based on the event-based activation proposed herein.

In another example, after the transmission of the SSS based measurement report, the WTRU may start a timer T3, after which the WTRU deactivates the associated SSS-based measurement and reporting, e.g., based on the SSS-MTC. This time delay T3 ensures that the network has received the report and is aware of the deactivation of the SSS-MTC at the WTRU side and may possibly turn on SSS transmission, e.g., if network is in dormant state.

Examples of SSS-measurement metric, event E1 and event E2 configurations are described below.

Metric M_SSS1: RSRP measurement value of the SSS.

Metric M_SSS2: RSRQ measurement value of the SSS.

Event E1_SSS1: MSSS1/MSSS2 is below a certain threshold TH1_SSS1. A hysteresis may be defined to prevent unnecessary frequent event triggering. A "timeToTrigger" parameter may define the time during which this criterion for the event needs to be met in order to trigger a measurement report.

Event E2_SSS1: MSSS1/MSSS2 is above a certain threshold TH2_SSS1. A hysteresis may be defined to prevent unnecessary frequent event triggering. A "timeToTrigger" parameter may define the time during which this criterion for the event needs to be met in order to trigger a measurement report.

If event E2_SSS1 is triggered, the WTRU deactivates the associated SSS-based measurement and reporting on the SSS-MTC (and may also deactivate the corresponding WTRU measurement gap). The deactivation of the SSS-MTC may also result in activation of associated PSS-based reporting. Examples of SSS reporting configuration triggered by Event E2_SSS1 are below.

Report R_SSS1: The WTRU may report metric M_SSS1/M_SSS2 and/or event E1_SSS1/E2_SSS2 back to the network. Accordingly, the network may use this feedback from the WTRU to configure SSS MTC periodicity.

Figure 7:
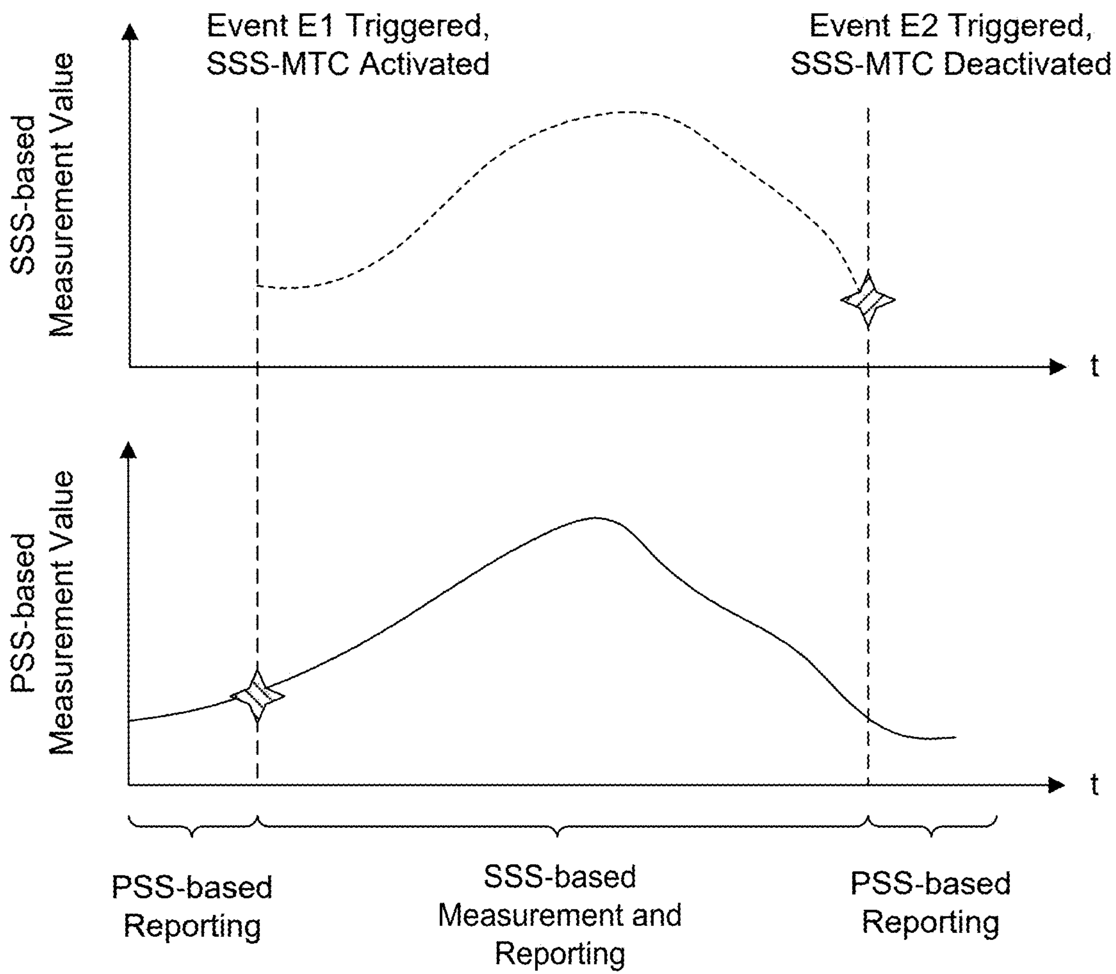
FIG. 7 is a diagram illustrating an example of activation and deactivation of SSS-based measurement and reporting, according to one or more embodiments.

FIG. 7 illustrates an exemplary activation and deactivation of SSS based measurement and reporting. A WTRU is configured with PSS-based event E1 and SSS-based event E2. Upon triggering of even E1, the WTRU reports that the event is triggered and activates the associated SSS-based measurement and reporting, e.g., based on the SSS-MTC. Similarly, upon triggering of event E2, the WTRU reports that the event is triggered and deactivates the SSS-based measurement and reporting, e.g., based on the SSS-MTC.

Representative Procedure for Event-Triggered Measurement Gap Update

As described above, a WTRU may be expected to perform SSS-based measurements in an SSS-MTC during some time periods, and not expected to perform SSS-based measurements in an SSS-MTC during other periods. In time periods during which the WTRU may perform the SSS-based measurements, it may be necessary for the WTRU to have a measurement gap (MG) on a serving cell that overlaps with the SSS-MTC. In time periods during which the WTRU doesn't perform the SSS-based measurements, it might not be necessary for the WTRU to have an MG on a serving cell that overlaps with the SSS-MTC. Since an MG may have a negative impact on WTRU performance in the serving cell, it may be beneficial to dynamically adapt the MG(s) according to the dynamic activation/deactivation of SSS-based measurements and corresponding SSS-MTC(s). Since the WTRU autonomously activates/deactivates SSS-based measurements and reporting, the MG adaptation may also be autonomously adapted by the WTRU.

In one embodiment, an MG may be configured to be a dynamic MG. An MG can be linked by configuration to a set of MTCs/MOs. At least one of the MTCs in the set may need to be an SSS-MTC that can be deactivated/activated. When a linked MTC is activated/deactivated, the WTRU may update the MG. When the WTRU updates the MG, the WTRU determines the MG as the union of the activated linked MTCs, perhaps plus RF retuning margins at the edges. If the union of MTCs has an internal gap longer than threshold T, then the MG is split, and perhaps additional RF retuning is added to the new MGs.

In another example, a dynamic MG doesn't need to be explicitly linked to MTCs/MOs. Instead, the WTRU may use a set of MTCs that may be activated/deactivated, e.g., SSS-MTC(s) as described herein, for the determination of the MG.

In an example, a configuration of a dynamic MG may also comprise one or more timers or time delays, e.g., T2 and T4 that are described below.

In an example, after a time delay T2 from the PSS based measurement report transmission, activation of SSS-MTC may also result in activation/adjustment of the associated WTRU measurement gap. This time delay T2 ensures that the network has received the report and is aware of any associated changes to the measurement gap. This also allows the serving cell to resume data transmission to the WTRU during the deactivated MGs (or MG parts).

In another example, after a time delay T4 from the SSS based measurement report transmission, deactivation of SSS-MTC may also result in deactivation/adjustment of the associated WTRU measurement gap. This time delay T4 ensures that the network has received the report and is aware of any associated changes to the measurement gap. This also allows the serving cell to avoid data transmission to the WTRU during the activated MGs (or MG parts).

MTCs (PSS-MTCs and SSS-MTCs) may be configured in the same or different measurement objects (MOs). A measurement gap may correspond to one or more MTCs and may be configured as the union of them. The MG configuration may be based on "configured links" between multiple MTCs in one or more MOs. When a link between two adjacent MTCs is activate, a MG is automatically formed. For example, a WTRU may be configured with two MOs, MO1 and MO2. In each MO, a set of 2 PSS-MTCs may be configured, PSS-MTC 1 and PSS-MTC 2. The links between the MOs may be defined as L1: {MO1, PSSMTC1}-{MO1, PSSMTC2} and L2: {MO2, PSSMTC1}-{MO2, PSSMTC2}. If PSS-MTC2 in MO1 is adjacent to PSS-MTC1 in MO2, an additional link may be defined as: L3: {MO1, PSSMTC2}-{MO2, PSSMTC1}.

When event E1/E2 is triggered, the WTRU determines a measurement gap update, if any, based on pre-defined rules and/or a configuration. Examples of MG updates may include activation/deactivation of MG, extending/shortening a MG, change of MG periodicity. The following are examples of MG update pre-defined or configured rules.

I. If no MTC within the MG is activated, the MG is deactivated.

II. If at least one MTC in the MG is activated, the MG is activated.

III. If an MTC located at the edge of the MG is activated, e.g., the MTC is both inside and outside the MG, the MG is extended by the duration of the activated MTC, or such that the MG includes the whole MTC (plus a margin).

IV. If an MTC located at the edge of the MG is deactivated, the MG is shorted by the duration of the deactivated MTC, or such that the MG includes the remaining active MTCs (plus a margin).

V. If a non-edge MTC is deactivated, the MG is split into two MGs, one on each side of the deactivated MTC. In some cases, this rule may be applicable only if the resulting time gap within the MG without any active MTC is longer than a threshold, which may be configurable or pre-defined; and/or VI. All adjacent MTCs which are active should automatically form a single MG. Two MTCs may be determined to be adjacent if they are separated by at most a certain time separation value, which may be configurable, wherein the value may be equal to or greater than zero.

Figure 8:
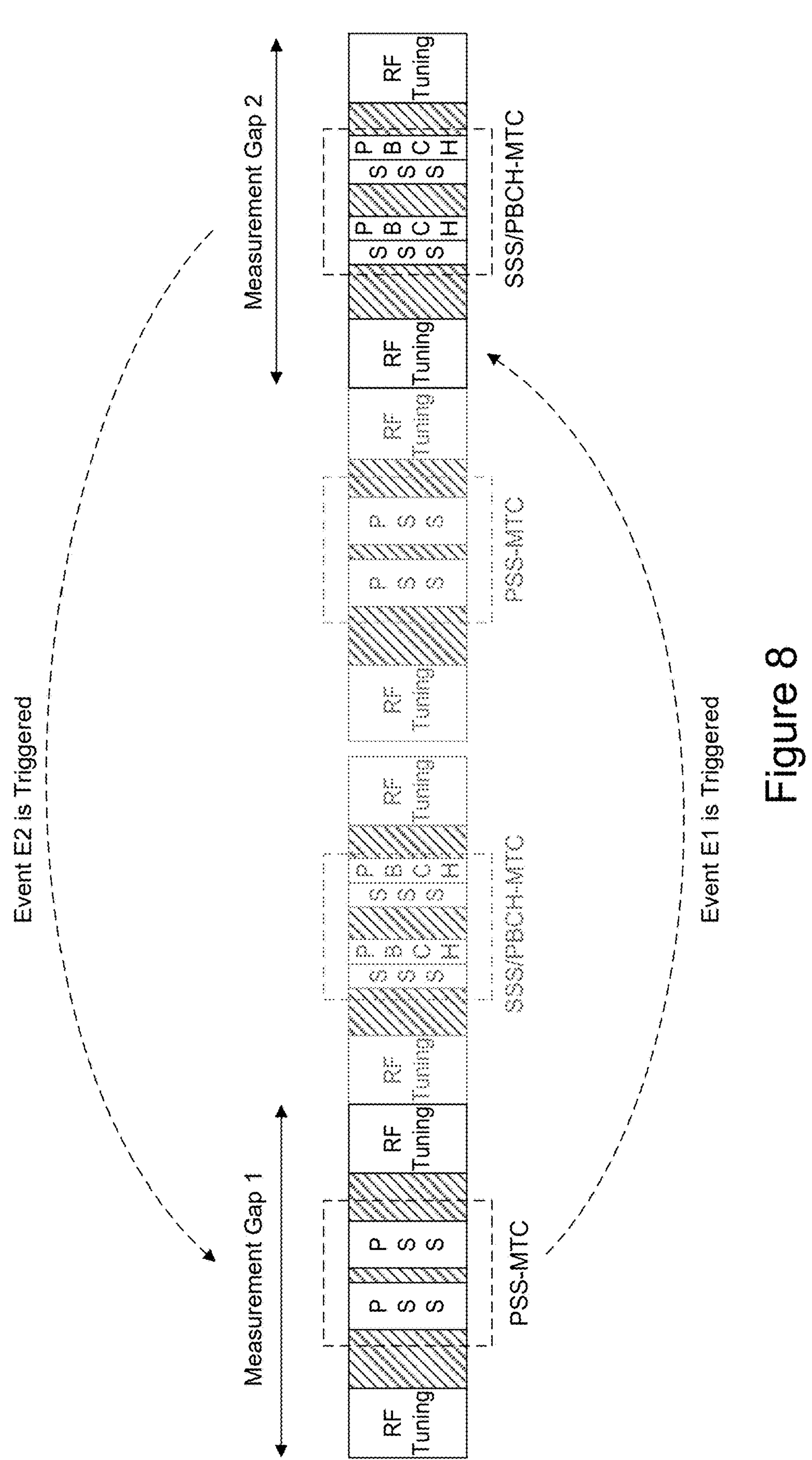
FIG. 8 is a diagram illustrating an example of measurement gap update with activation/deactivation of measurement gaps based on events E1/E2, according to one or more embodiments.

FIG. 8 shows an exemplary activation/deactivation of different measurement gaps based on Events E1/E2. The figure shows MG 1 and MG 2 which comprise of PSS-MTC and SSS-MTC, respectively. When event E2 is triggered, the WTRU activates PSS-MTC (activates MG 1 per rule II) and deactivates SSS-MTC (deactivates MG 2 per rule I). When event E1 is triggered, the WTRU deactivates PSS-MTC (deactivates MG 1 per rule I) and activates SSS-MTC (activates MG 2 per rule II). In other examples, the PSS-MTC isn't activated/deactivated upon E1/E1, which means that measurement gap 1 may be active while only measurement gap 2 is activated/deactivated.

Figure 9:
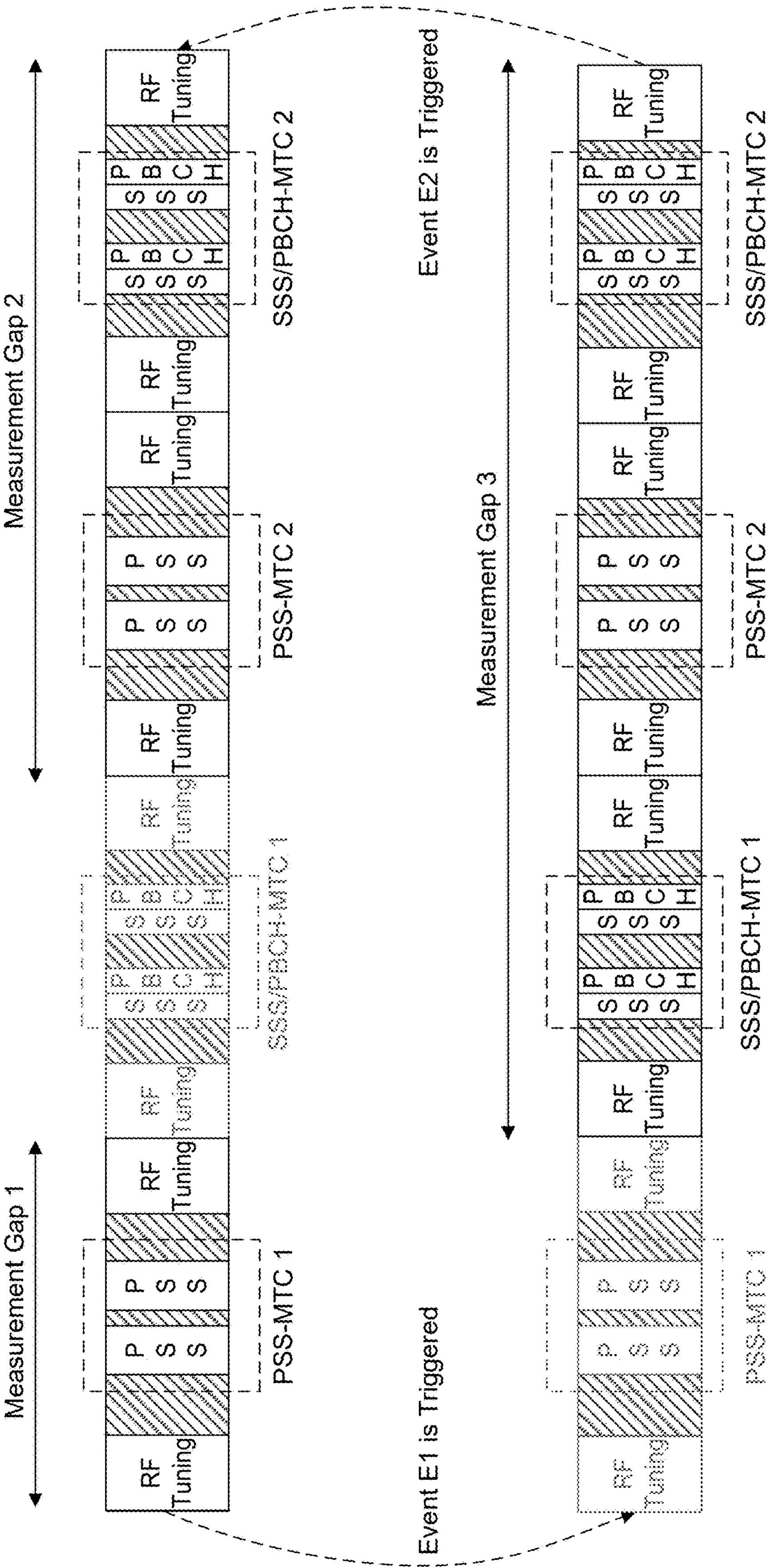
FIG. 9 is a diagram illustrating an example of activation, deactivation, and adjustment of measurement gaps based on Events E1/E2, according to one or more embodiments

FIG. 9 illustrates another exemplary activation/deactivation/adjustment of measurement gaps based on Events E1/E2. In this example, measurement gap update is provided with one active MTC (measurement gap 1), two active MTCs (measurement gap 2), and three active MTCs (measurement gap 3).

Referring to FIG. 9, MG 1 and MG 2 comprise PSS-MTC 1 and PSS-MTC 2/SSS-MTC 2, respectively. When event E2 is triggered, the WTRU activates PSS-MTC 1 (activates MG 1 per rule II) and deactivates SSS-MTC 1 (adjusts MG 3 resulting in MG 2 per rules IV and III, respectively). When event E1 is triggered, the WTRU deactivates PSS-MTC 1 (deactivates MG 1 per rule I) and activates SSS-MTC 1 (adjusts MG 2 per rule III and/or VI resulting in MG 3). Activated SSS-MTC 1 is adjacent to MG 2 and therefore the combination automatically forms MG 3 (per rule VI). Note that the numbering of MGs, e.g., MG2 and MG3, does not imply that the MGs need to be seen as separate MGs. Instead, the different MG properties (e.g., starting time, duration) may correspond to the dynamic adjustment of a single MG, e.g., a configured dynamic MG.

Representative Procedure for SC-FDE WTRU Capability Request and Response

In one embodiment, the serving cell may request the WTRU to inform about its SC-FDE capability by sending a specific RRC parameter in, for example, "WTRU capability Enquiry". For example, the enquiry may include a request to identify any SC-FDE specific radio access technology (RAT) that the WTRU supports. Under each RAT, the enquiry may request information about the supported SC-FDE bands. It may also request the WTRU to indicate its support for NR-SC-FDE Dual Connectivity. The WTRU may also be requested to indicate whether it supports certain NR events when measuring for received RSRP on SC-FDE cell. Additionally, the network may define the supported symbol rate and reference frequencies and request the WTRU to indicate which rate/reference frequency it can support.

PSS-based measurement and reporting capability enquiry. The network may list a set of SC-FDE required/supported features and may request the WTRU to indicate its support for each. For example, the WTRU may be enquired to indicate its support for PSS-based measurement, reporting, and events.

WTRU-initiated SSS-MTC activation/deactivation capability enquiry. The WTRU be enquired to indicate its support for WTRU-initiated SSS-MTC activation/deactivation. Furthermore, the WTRU may be requested to indicate a list of sub-features required to support WTRU-initiated SSS-MTC activation/deactivation. The list of sub-features may include PSS-based measurement, PSS based reporting, SSS based measurement, SSS based reporting and corresponding SSS-MTC activation/deactivation events. The network may also enquire about WTRU's support for dynamic measurement gaps.

In an example, the WTRU responds to this capability enquiry via "WTRU capability information message" with specific entries. Capabilities relating to the supported SC-FDE RATs, bands/frequencies and symbol rates may be carried in the RF/PHY portion of the report. Capabilities relating to the support of PSS-based measurement and reporting and WTRU-initiated SSS-MTC activation/deactivation may be carried in the Feature Sets portion of the message.

Representative Procedure for Determining SC-FDE Measurement and Reporting Configurations In one embodiment, the WTRU may receive a measurement configuration which includes measurement gap configurations etc. specific to SC-FDE. These measurement gap configurations may include time domain locations of windows during which the WTRU may perform PSS and SSS based measurements on SC-FDE carriers. New values for Measurement Gap Repetition Period (mgrp), Gap Offset (gapOffset), Measurement Gap Length (mgl) and Measurement Gap Timing Advance (mgta) may need to be defined for SC-FDE carrier frequency. The measurement configuration may also include measurement objects for PSS and SSS MTCs. These measurement objects may contain PSS/SSS Symbol rates and PSS/SSS MTC configurations (e.g., periodicity, offset and duration). It may also include defined rules for dynamic measurement gap updates.

The PSS and SSS reporting configuration may indicate the reference signal (PSS or SSS) to be measured. It may also determine the measurement report format, triggering events, triggering criteria and other parameters (thresholds, hysteresis, offsets, etc.). For example, the configuration may define the PSS and SSS-based report format to include the measurement metric, corresponding measurement value, time offset from a reference point (e.g., start of the MTC) under a specific SC-FDE measurement result IE. Moreover, for SSS-based reports, the WTRU may report activated/deactivated SSS-MTCs and measurement gaps, if any.

Example Procedures for PSS and SSS Reporting Activation/Deactivation

In an example, a WTRU may perform PSS measurement and reporting. The WTRU initiate SSS-MTC activation/deactivation when corresponding events are triggered. For example, the WTRU is configured by a serving cell with a PSS-based measurement and reporting, a synchronization frequency; a PSS MTC time configuration; PSS-based metrics, events and reporting criteria; and/or PSS-based event E1. In an example, the WTRU is configured by a serving cell with an SSS-based measurement and reporting, an SSS MTC time configuration; SSS-based metrics, events and reporting criteria; and/or SSS-based event E2.

In an example, the WTRU performs PSS measurement in the configured PSS MTC window. If event E1 is triggered, the WTRU reports one or more of the following: triggering of event E1 which indicates the activation of associated SSS-based measurement and reporting, or PSS measurement value(s) that triggered event E1. The WTRU may activate associated SSS-based measurement and reporting. If event E2 is triggered, the WTRU reports the following: triggering of event E2 which indicates the deactivation of the associated SSS-based measurement and reporting, or SSS measurement value(s) that triggered event E2.

In another example, a WTRU may perform PSS measurement and reporting. The WTRU initiate SSS-MTC activation/deactivation when corresponding events are triggered. The WTRU is configured by a serving cell with PSS-based measurement and reporting, a synchronization frequency, a PSS MTC time configuration, and/or PSS-based event E1. The WTRU is also configured with SSS-based measurement and reporting, SSS MTC time configuration; SSS-based metrics, events and reporting criteria; and/or SSS-based event E2.

In an example, the WTRU performs PSS measurement in the configured PSS MTC window. If event E1 is triggered, the WTRU reports the following: 1) triggering of event E1 which indicates the activation of associated SSS-based measurement and reporting; and/or 2) PSS measurement value(s) that triggered event E1. The WTRU may deactivate PSS-based reporting and may activate associated SSS-based measurement and reporting. If event E2 is triggered, the WTRU reports 1) triggering of event E2 which indicates the deactivation of the associated SSS-based measurement and reporting, and/or SSS measurement value(s) that triggered event E2. The WTRU may deactivate SSS-based measurement and reporting and may activate the associated PSS-based reporting.

In an example, a method implemented in a WTRU for wireless communications includes receiving configuration information indicating 1) a primary synchronization signal (PSS) configuration, 2) a secondary synchronization signal (SSS) configuration, 3) a PSS measurement timing configuration, 4) an SSS measurement timing configuration, and 5) one or more triggering conditions for measurement reporting; performing measurement for one or more PSSs based on the PSS measurement timing configuration; transmitting, based on a triggering condition of the one or more triggering conditions being met, a first measurement report for the one or more PSSs using the PSS configuration; determining, based on the triggering condition being met, that SSS measurement reporting is activated; performing measurement for one or more SSSs based on the SSS measurement timing configuration; and transmitting a second measurement report for the one or more SSSs using the SSS configuration and after transmitting the first measurement report.

In an example, the SSS measurement reporting being activated comprises activating the SSS measurement timing configuration. In an example, the activating of the SSS measurement timing configuration is associated with an adjustment of a measurement gap.

In an example, the triggering condition comprises a measurement value for the one or more PSSs being greater than a threshold.

In an example, the PSS measurement timing configuration indicates a first time period for measuring the one or more PSSs, and the SSS measurement timing configuration indicates a second time period for measuring the one or more SSSs.

In an example, when the SSS measurement reporting is activated, the method includes deactivating PSS measurement reporting.

In an example, the triggering condition may be a first triggering condition, and the method may also include determining that a second triggering condition of the one or more triggering conditions is met, and the second triggering condition comprises a measurement value for the one or more SSSs being less than a threshold. In an example, the second measurement report is transmitted based on the second triggering condition being met. In an example, the method includes determining, based on the second triggering condition being met, that SSS measurement reporting is deactivated after the second measurement report is transmitted. In an example, when the SSS measurement reporting is deactivated, the method also includes activating PSS measurement reporting.

In an example, the SSS measurement reporting being deactivated comprises deactivating the SSS measurement timing configuration, and the deactivating of the SSS measurement timing configuration is associated with an adjustment of a measurement gap.

In another example, a WTRU for wireless communications, comprising circuitry, including a transmitter, receiver, a processor and memory is provided. The WTRU is configured to receive configuration information indicating a PSS configuration, an SSS configuration, a PSS measurement timing configuration, an SSS measurement timing configuration, and/or one or more triggering conditions for measurement reporting; to perform measurement for one or more PSSs based on the PSS measurement timing configuration; to transmit, based on a triggering condition of the one or more triggering conditions being met, a first measurement report for the one or more PSSs using the PSS configuration; to determine, based on the triggering condition being met, that SSS measurement reporting is activated; to perform measurement for one or more SSSs based on the SSS measurement timing configuration; and to transmit a second measurement report for the one or more SSSs using the SSS configuration and after transmitting the first measurement report.

In an example, the WTRU is further configured to, when the SSS measurement reporting is activated, activate the SSS measurement timing configuration. In an example, the activating of the SSS measurement timing configuration is associated with an adjustment of a measurement gap.

In an example, the triggering condition comprises a measurement value for the one or more PSSs being greater than a threshold.

In an example, the PSS measurement timing configuration indicates a first time period for measuring the one or more PSSs, and the SSS measurement timing configuration indicates a second time period for measuring the one or more SSSs.

In an example, the WTRU is further configured to, when the SSS measurement reporting is activated, deactivate PSS measurement reporting.

In an example, the triggering condition is a first triggering condition, the WTRU is further configured to determine that a second triggering condition of the one or more triggering conditions is met, and the second triggering condition comprises a measurement value for the one or more SSSs being less than a threshold. In an example, the second measurement report is transmitted based on the second triggering condition being met.

In an example, the WTRU is further configured to determine, based on the second triggering condition being met, that SSS measurement reporting is deactivated after the second measurement report is transmitted; and/or activate PSS measurement reporting when the SSS measurement reporting is deactivated.

In another example, a method implemented in a WTRU for wireless communications includes receiving configuration information indicating a primary synchronization signal (PSS) configuration and a secondary synchronization signal (SSS) configuration, wherein the PSS configuration indicates a triggering condition, and wherein the SSS configuration indicates a time offset and a time period for SSS measurement; transmitting, based on the triggering condition being met, a measurement report for one or more PSSs using the PSS configuration; and performing, after the time offset starting from the triggering condition being met, measurement for one or more SSSs in the time period.

In an example, the SSS configuration comprises an SSS measurement timing configuration.

In an example, the triggering condition is associated with an activation of the SSS measurement timing configuration.

In an example, the performing of measurement for the one or more SSSs comprises activating the SSS measurement timing configuration.

In an example, the triggering condition comprises a measurement value for the one or more PSSs being greater than a threshold.

In an example, the time offset or the time period comprises a set of time units being zero or greater than zero, and wherein the set of time units comprises one or more subframes, time slots, or symbols.

In an example, when performing measurement for the one or more SSSs, the method also includes deactivating PSS measurement reporting.

In an example, the triggering condition is associated with an adjustment of a measurement gap.

In an example, the triggering condition is a first triggering condition, the SSS configuration indicates a second triggering condition, and the second triggering condition comprises a measurement value for the SSS being less than a threshold.

In an example, the method also includes transmitting, based on the second triggering condition being met, a measurement report for one or more SSSs; and performing, after a second time offset starting from the second triggering condition being met, measurement for a set of PSSs in a second time period.

In an example, the method also includes, when performing measurement for the set of PSSs, deactivating SSS measurement reporting.

In an example, the second triggering condition is associated with an adjustment of a measurement gap.

In another example, a WTRU comprises circuitry, including a transmitter, receiver, a processor and memory, and the WTRU is configured to receive configuration information indicating a primary synchronization signal (PSS) configuration and a secondary synchronization signal (SSS) configuration, wherein the PSS configuration indicates a triggering condition, and wherein the SSS configuration indicates a time offset and a time period for SSS measurement. The WTRU is further configured to transmit, based on the triggering condition being met, a measurement report for one or more PSSs using the PSS configuration; and to perform, after the time offset starting from the triggering condition being met, measurement for one or more SSSs in the time period.

In an example, the SSS configuration comprises an SSS measurement timing configuration.

In an example, when performing measurement for the one or more SSSs, the WTRU is further configured to activate the SSS measurement timing configuration.

In an example, the triggering condition i) comprises a measurement value for the PSS being greater than a threshold and/or ii) is associated with an activation of a measurement timing configuration associated with the SSS.

In an example, the triggering condition is associated with an adjustment of a measurement gap.

In an example, the triggering condition is a first triggering condition, the SSS configuration indicates a second triggering condition, and the second triggering condition comprises a measurement value for the SSS being less than a threshold.

In an example, the WTRU is further configured to transmit, based on the second triggering condition being met, a measurement report for one or more SSSs; and to perform, after a second time offset starting from the second triggering condition being met, measurement for a set of PSSs in a second time period.

In an example, when performing measurement for the set of PSSs, the WTRU is further configured to deactivate SSS measurement reporting.

Abbreviations and Acronyms

ADC Analog-to-Digital Conversion
ARFCN Absolute Radio-Frequency Channel Number
BPSK Binary PSK
CP Cyclic Prefix
CP-OFDM Conventional OFDM (relying on cyclic prefix)
CSI Channel State Information
DAC Digital-to-Analog Conversion
DMRS Demodulation Reference Signal
ID Identity, Identifier, or Index
LTE Long Term Evolution, e.g., from 3GPP LTE R8 and up
NR New Radio
OFDM Orthogonal Frequency-Division Multiplexing
PAPR Peak to Average Power Ratio
PBCH Physical Broadcast Channel
PCI Physical Cell ID
PSK Phase Shift Keying
PSS Primary Synchronization Signal
QCL Quasi Collocation
RF Radio Front end
RRC Radio Resource Control
RRM Radio Resource Management
RS Reference Signal
RSRP Reference Signal Received Power
RSRQ Reference Signal Received Quality
SC-FDE Single Carrier Frequency Domain Equalization
SS Synchronization Signal
SSS Secondary Synchronization Signal
TRP Transmission/Reception Point

Conclusion

Although features and elements are provided above in particular combinations, one of ordinary skill in the art will appreciate that each feature or element can be used alone or in any combination with the other features and elements.

The present disclosure is not to be limited in terms of the particular embodiments described in this application, which are intended as illustrations of various aspects. Many modifications and variations may be made without departing from its spirit and scope, as will be apparent to those skilled in the art. No element, act, or instruction used in the description of the present application should be construed as critical or essential to the invention unless explicitly provided as such. Functionally equivalent methods and apparatuses within the scope of the disclosure, in addition to those enumerated herein, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is to be understood that this disclosure is not limited to particular methods or systems.

The foregoing embodiments are discussed, for simplicity, with regard to the terminology and structure of infrared capable devices, i.e., infrared emitters and receivers. However, the embodiments discussed are not limited to these systems but may be applied to other systems that use other forms of electromagnetic waves or non-electromagnetic waves such as acoustic waves.

It is also to be understood that the terminology used herein is for the purpose of describing particular embodiments only, and is not intended to be limiting. As used herein, the term "video" or the term "imagery" may mean any of a snapshot, single image and/or multiple images displayed over a time basis. As another example, when referred to herein, the terms "user equipment" and its abbreviation "UE", the term "remote" and/or the terms "head mounted display" or its abbreviation "HMD" may mean or include (i) a wireless transmit and/or receive unit (WTRU); (ii) any of a number of embodiments of a WTRU; (iii) a wireless-capable and/or wired-capable (e.g., tetherable) device configured with, inter alia, some or all structures and functionality of a WTRU; (iii) a wireless-capable and/or wired-capable device configured with less than all structures and functionality of a WTRU; or (iv) the like. Details of an example WTRU, which may be representative of any WTRU recited herein, are provided herein with respect to FIGS. 1A-1D. As another example, various disclosed embodiments herein supra and infra are described as utilizing a head mounted display. Those skilled in the art will recognize that a device other than the head mounted display may be utilized and some or all of the disclosure and various disclosed embodiments can be modified accordingly without undue experimentation. Examples of such other device may include a drone or other device configured to stream information for providing the adapted reality experience.

In addition, the methods provided herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

Variations of the method, apparatus and system provided above are possible without departing from the scope of the invention. In view of the wide variety of embodiments that can be applied, it should be understood that the illustrated embodiments are examples only, and should not be taken as limiting the scope of the following claims. For instance, the embodiments provided herein include handheld devices, which may include or be utilized with any appropriate voltage source, such as a battery and the like, providing any appropriate voltage.

Moreover, in the embodiments provided above, processing platforms, computing systems, controllers, and other devices that include processors are noted. These devices may include at least one Central Processing Unit ("CPU") and memory. In accordance with the practices of persons skilled in the art of computer programming, reference to acts and symbolic representations of operations or instructions may be performed by the various CPUs and memories. Such acts and operations or instructions may be referred to as being "executed," "computer executed" or "CPU executed."

One of ordinary skill in the art will appreciate that the acts and symbolically represented operations or instructions include the manipulation of electrical signals by the CPU. An electrical system represents data bits that can cause a resulting transformation or reduction of the electrical signals and the maintenance of data bits at memory locations in a memory system to thereby reconfigure or otherwise alter the CPU's operation, as well as other processing of signals. The memory locations where data bits are maintained are physical locations that have particular electrical, magnetic, optical, or organic properties corresponding to or representative of the data bits. It should be understood that the embodiments are not limited to the above-mentioned platforms or CPUs and that other platforms and CPUs may support the provided methods.

The data bits may also be maintained on a computer readable medium including magnetic disks, optical disks, and any other volatile (e.g., Random Access Memory (RAM)) or non-volatile (e.g., Read-Only Memory (ROM)) mass storage system readable by the CPU. The computer readable medium may include cooperating or interconnected computer readable medium, which exist exclusively on the processing system or are distributed among multiple interconnected processing systems that may be local or remote to the processing system. It should be understood that the embodiments are not limited to the above-mentioned memories and that other platforms and memories may support the provided methods.

In an illustrative embodiment, any of the operations, processes, etc. described herein may be implemented as computer-readable instructions stored on a computer-readable medium. The computer-readable instructions may be executed by a processor of a mobile unit, a network element, and/or any other computing device.

There is little distinction left between hardware and software implementations of aspects of systems. The use of hardware or software is generally (but not always, in that in certain contexts the choice between hardware and software may become significant) a design choice representing cost versus efficiency tradeoffs. There may be various vehicles by which processes and/or systems and/or other technologies described herein may be affected (e.g., hardware, software, and/or firmware), and the preferred vehicle may vary with the context in which the processes and/or systems and/or other technologies are deployed. For example, if an implementer determines that speed and accuracy are paramount, the implementer may opt for a mainly hardware and/or firmware vehicle. If flexibility is paramount, the implementer may opt for a mainly software implementation. Alternatively, the implementer may opt for some combination of hardware, software, and/or firmware.

The foregoing detailed description has set forth various embodiments of the devices and/or processes via the use of block diagrams, flowcharts, and/or examples. Insofar as such block diagrams, flowcharts, and/or examples include one or more functions and/or operations, it will be understood by those within the art that each function and/or operation within such block diagrams, flowcharts, or examples may be implemented, individually and/or collectively, by a wide range of hardware, software, firmware, or virtually any combination thereof. In an embodiment, several portions of the subject matter described herein may be implemented via Application Specific Integrated Circuits (ASICs), Field Programmable Gate Arrays (FPGAs), digital signal processors (DSPs), and/or other integrated formats. However, those skilled in the art will recognize that some aspects of the embodiments disclosed herein, in whole or in part, may be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure. In addition, those skilled in the art will appreciate that the mechanisms of the subject matter described herein may be distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a CD, a DVD, a digital tape, a computer memory, etc., and a transmission type medium such as a digital and/or an analog communication medium (e.g., a fiber optic cable, a waveguide, a wired communications link, a wireless communication link, etc.).

Those skilled in the art will recognize that it is common within the art to describe devices and/or processes in the fashion set forth herein, and thereafter use engineering practices to integrate such described devices and/or processes into data processing systems. That is, at least a portion of the devices and/or processes described herein may be integrated into a data processing system via a reasonable amount of experimentation. Those having skill in the art will recognize that a typical data processing system may generally include one or more of a system unit housing, a video display device, a memory such as volatile and non-volatile memory, processors such as microprocessors and digital signal processors, computational entities such as operating systems, drivers, graphical user interfaces, and applications programs, one or more interaction devices, such as a touch pad or screen, and/or control systems including feedback loops and control motors (e.g., feedback for sensing position and/or velocity, control motors for moving and/or adjusting components and/or quantities). A typical data processing system may be implemented utilizing any suitable commercially available components, such as those typically found in data computing/communication and/or network computing/communication systems.

The herein described subject matter sometimes illustrates different components included within, or connected with, different other components. It is to be understood that such depicted architectures are merely examples, and that in fact many other architectures may be implemented which achieve the same functionality. In a conceptual sense, any arrangement of components to achieve the same functionality is effectively "associated" such that the desired functionality may be achieved. Hence, any two components herein combined to achieve a particular functionality may be seen as "associated with" each other such that the desired functionality is achieved, irrespective of architectures or intermedial components. Likewise, any two components so associated may also be viewed as being "operably connected", or "operably coupled", to each other to achieve the desired functionality, and any two components capable of being so associated may also be viewed as being "operably couplable" to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, where only one item is intended, the term "single" or similar language may be used. As an aid to understanding, the following appended claims and/or the descriptions herein may include usage of the introductory phrases "at least one" and "one or more" to introduce claim recitations. However, the use of such phrases should not be construed to imply that the introduction of a claim recitation by the indefinite articles "a" or "an" limits any particular claim including such introduced claim recitation to embodiments including only one such recitation, even when the same claim includes the introductory phrases "one or more" or "at least one" and indefinite articles such as "a" or "an" (e.g., "a" and/or "an" should be interpreted to mean "at least one" or "one or more"). The same holds true for the use of definite articles used to introduce claim recitations. In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, the terms "any of" followed by a listing of a plurality of items and/or a plurality of categories of items, as used herein, are intended to include "any of," "any combination of," "any multiple of," and/or "any combination of multiples of" the items and/or the categories of items, individually or in conjunction with other items and/or other categories of items. Moreover, as used herein, the term "set" is intended to include any number of items, including zero. Additionally, as used herein, the term "number" is intended to include any number, including zero. And the term "multiple", as used herein, is intended to be synonymous with "a plurality".

In addition, where features or aspects of the disclosure are described in terms of Markush groups, those skilled in the art will recognize that the disclosure is also thereby described in terms of any individual member or subgroup of members of the Markush group.

As will be understood by one skilled in the art, for any and all purposes, such as in terms of providing a written description, all ranges disclosed herein also encompass any and all possible subranges and combinations of subranges thereof. Any listed range can be easily recognized as sufficiently describing and enabling the same range being broken down into at least equal halves, thirds, quarters, fifths, tenths, etc. As a non-limiting example, each range discussed herein may be readily broken down into a lower third, middle third and upper third, etc. As will also be understood by one skilled in the art all language such as "up to," "at least," "greater than," "less than," and the like includes the number recited and refers to ranges which can be subsequently broken down into subranges as discussed above. Finally, as will be understood by one skilled in the art, a range includes each individual member. Thus, for example, a group having 1-3 cells refers to groups having 1, 2, or 3 cells. Similarly, a group having 1-5 cells refers to groups having 1, 2, 3, 4, or 5 cells, and so forth.

Moreover, the claims should not be read as limited to the provided order or elements unless stated to that effect. In addition, use of the terms "means for" in any claim is intended to invoke 35 U.S.C. § 112, 6 or means-plus-function claim format, and any claim without the terms "means for" is not so intended.

What is claimed is:

1. A method implemented in a wireless transmit/receive unit (WTRU) for wireless communications, the method comprising:

receiving configuration information indicating 1) a primary synchronization signal (PSS) configuration, 2) a secondary synchronization signal (SSS) configuration, 3) a PSS measurement timing configuration, 4) an SSS measurement timing configuration, and 5) one or more triggering conditions for measurement reporting;

performing measurement for one or more PSSs based on the PSS measurement timing configuration;

transmitting, based on a triggering condition of the one or more triggering conditions being met, a first measurement report for the one or more PSSs using the PSS configuration;

determining, based on the triggering condition being met, that SSS measurement reporting is activated;

performing measurement for one or more SSSs based on the SSS measurement timing configuration; and transmitting a second measurement report for the one or more SSSs using the SSS configuration and after transmitting the first measurement report.

2. The method of claim 1, wherein the SSS measurement reporting being activated comprises activating the SSS measurement timing configuration.

3. The method of claim 2, wherein the activating of the SSS measurement timing configuration is associated with an adjustment of a measurement gap.

4. The method of claim 1, wherein the triggering condition comprises a measurement value for the one or more PSSs being greater than a threshold.

5. The method of claim 1, wherein the PSS measurement timing configuration indicates a first time period for measuring the one or more PSSs, and the SSS measurement timing configuration indicates a second time period for measuring the one or more SSSs.

6. The method of claim 1, further comprising, when the SSS measurement reporting is activated, deactivating PSS measurement reporting.

7. The method of claim 1, wherein the triggering condition is a first triggering condition, wherein the method further comprising determining that a second triggering condition of the one or more triggering conditions is met, and wherein the second triggering condition comprises a measurement value for the one or more SSSs being less than a threshold.

8. The method of claim 7, wherein the second measurement report is transmitted based on the second triggering condition being met.

9. The method of claim 7, further comprising determining, based on the second triggering condition being met, that SSS measurement reporting is deactivated after the second measurement report is transmitted.

10. The method of claim 9, further comprising, when the SSS measurement reporting is deactivated, activating PSS measurement reporting.

11. The method of claim 9, wherein the SSS measurement reporting being deactivated comprises deactivating the SSS measurement timing configuration, and wherein the deactivating of the SSS measurement timing configuration is associated with an adjustment of a measurement gap.

12. A wireless transmit/receive unit (WTRU) for wireless communications, comprising circuitry, including a transmitter, receiver, a processor and memory, the WTRU configured to:

receive configuration information indicating 1) a primary synchronization signal (PSS) configuration, 2) a secondary synchronization signal (SSS) configuration, 3) a PSS measurement timing configuration, 4) an SSS measurement timing configuration, and 5) one or more triggering conditions for measurement reporting;

perform measurement for one or more PSSs based on the PSS measurement timing configuration;

transmit, based on a triggering condition of the one or more triggering conditions being met, a first measurement report for the one or more PSSs using the PSS configuration;

determine, based on the triggering condition being met, that SSS measurement reporting is activated;

perform measurement for one or more SSSs based on the SSS measurement timing configuration; and transmit a second measurement report for the one or more SSSs using the SSS configuration and after transmitting the first measurement report.

13. The WTRU of claim 12, wherein the WTRU is further configured to, when the SSS measurement reporting is activated, activate the SSS measurement timing configuration.

14. The WTRU of claim 13, wherein the activating of the SSS measurement timing configuration is associated with an adjustment of a measurement gap.

15. The WTRU of claim 12, wherein the triggering condition comprises a measurement value for the one or more PSSs being greater than a threshold.

16. The WTRU of claim 12, wherein the PSS measurement timing configuration indicates a first time period for measuring the one or more PSSs, and the SSS measurement timing configuration indicates a second time period for measuring the one or more SSSs.

17. The WTRU of claim 12, wherein the WTRU is further configured to, when the SSS measurement reporting is activated, deactivate PSS measurement reporting.

18. The WTRU of claim 12, wherein the triggering condition is a first triggering condition, the WTRU is further configured to determine that a second triggering condition of the one or more triggering conditions is met, and wherein the second triggering condition comprises a measurement value for the one or more SSSs being less than a threshold.

19. The WTRU of claim 18, wherein the second measurement report is transmitted based on the second triggering condition being met.

20. The WTRU of claim 18, wherein the WTRU is further configured to:

determine, based on the second triggering condition being met, that SSS measurement reporting is deactivated after the second measurement report is transmitted; or activate PSS measurement reporting when the SSS measurement reporting is deactivated.

* * * * *